(12) United States Patent  (10) Patent No.: US 7,644,115 B2
Granger  (45) Date of Patent: Jan. 5, 2010

(54) SYSTEM AND METHODS FOR LARGE-RADIX COMPUTER PROCESSING

(75) Inventor: Gregory O. Granger, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 650 days.

(21) Appl. No.: 11/031,749

(22) Filed: Jan. 7, 2005

(65) Prior Publication Data

US 2006/0155796 A1    Jul. 13, 2006

(51) Int. Cl.
*G06F 7/00*    (2006.01)
(52) U.S. Cl. ...................................... 708/204
(58) Field of Classification Search .......... 708/200–209
See application file for complete search history.

(56) References Cited

U.S. PATENT DOCUMENTS

| | | | |
|---|---|---|---|
| 3,943,350 A * | 3/1976 | Lanning | 341/84 |
| 5,408,425 A * | 4/1995 | Hou | 708/402 |
| 6,437,715 B1 | 8/2002 | Cowlishaw | |
| 6,525,679 B1 | 2/2003 | Cowlishaw | |
| 6,546,411 B1 | 4/2003 | Singh | |
| 6,792,441 B2 * | 9/2004 | Jaber | 708/409 |
| 7,318,080 B2 * | 1/2008 | Berkeman | 708/625 |
| 2002/0188647 A1 * | 12/2002 | Dovi | 709/101 |
| 2004/0236810 A1 * | 11/2004 | Yamamoto et al. | 708/404 |
| 2005/0050119 A1 * | 3/2005 | Vandanapu | 708/207 |
| 2005/0055389 A1 * | 3/2005 | Ramanujam | 708/204 |
| 2006/0095487 A1 * | 5/2006 | Brebisson | 708/204 |

* cited by examiner

*Primary Examiner*—Chat C Do
(74) *Attorney, Agent, or Firm*—Jones Day

(57) ABSTRACT

Systems and methods for performing large-radix numeric operations. A first number may be segmented into large-radix segments, wherein numbers of the segments are generated such that radix of the segment is greater than radix of the first number. As a result, a plurality of disparate processor-based computing systems may be configured to perform various numeric operations on the large-radix segments of the number and output results of a numeric operation as a number whose radix is equal to the radix of the first number.

27 Claims, 18 Drawing Sheets

```
/* multiplication loops
accumulate product sums in prod[] (FO2digits)
in this loop prod is of type double and a-> d [*] and b-> [*] are
of type float.
*/
for (i=0; i < a->digitsUsed; i++){
    for (j=0; j < b-> digitsUsed; j++){
        prod[i+j] += (double) a->d [i] * (double) b->d [j];
        }
    }
/* break prod[] (double) into cp[] (float) with carry propagation*/
/* Split will split the first argument into a hi and a lo base digit
*/
Split (prod[0], hi, lo);
cp[0] = lo;
carry = ZeroInBase;
for (i=1; i < productSize; i++) {
    t = hi + carry;
    Split (prod[i], hi, lo);
    t += lo;

if (t ≥ Base) {
        Split (t, carry, cp[i]);
        }
    else {
        cp[i] = (float) t;
        carry = ZeroInBase;
        }
    }
/*end multiplication loops */
```

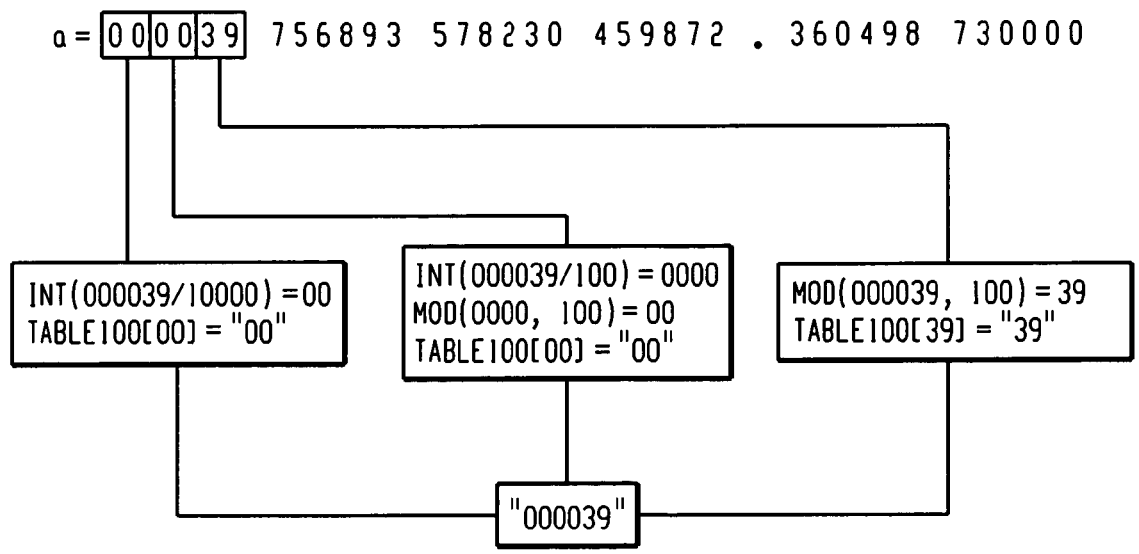

Fig. 11B

|  | CMS (370) | WinNT (i386) | BSD i(386) | LINUX (i386) | DEV HP(PA) | SUN (SPARC) | AIX (POWERPC) |
|---|---|---|---|---|---|---|---|
| SHORT/FLOAT + | 143.06% | 141.69% | 144.64% | 156.82% | 175.00% | 146.59% | 148.68% |
| SHORT/FLOAT − | 143.05% | 150.00% | 150.00% | 131.25% | 141.67% | 168.29% | 148.68% |
| SHORT/FLOAT * | 128.97% | 158.31% | 162.93% | 156.82% | 658.33% | 343.75% | 245.05% |
| SHORT/FLOAT / | 124.01% | 178.81% | 176.00% | 147.76% | 205.06% | 334.62% | 164.82% |

\* FLOAT TYPE FOR CMS/370 IS IBM FORMAT, ALL OTHER PLATFORMS USE IEEE 754

*Fig. 12*

| COUNT 10,000,000 | INTEL CICS PROCESSOR (WINDOWS XP) | | HP RISC PROCESSOR (HP-UX) | |
|---|---|---|---|---|
| INTEGERS | TIME | OP COST | TIME | OP COST |
| BASE OPERATIONS | (SEC) | T/INT ASSIGN | (SEC) | T/INT ASSIGN |
| INT ASSIGN | 0.0630 | 100.00% | 0.11 | 100.00% |
| INTS | | | | |
| INT + | 0.0780 | 123.81% | 0.1210 | 110.00% |
| INT − | 0.0724 | 114.92% | 0.1310 | 119.09% |
| INT * | 0.0764 | 121.27% | 0.5480 | 498.18% |
| INT / | 0.3656 | 580.32% | 0.8700 | 790.91% |
| MIXED | | | | |
| INT = SHORT + SHORT | 0.0750 | 119.05% | 0.1250 | 113.64% |
| INT = SHORT − SHORT | 0.0734 | 116.51% | 0.1500 | 136.36% |
| INT = SHORT * SHORT | 0.0904 | 143.49% | 0.5600 | 509.09% |
| INT = INT/SHORT | 0.2283 | 362.38% | 0.8700 | 790.91% |
| FLOATING POINT | | | | |
| DOUBLES | | | | |
| DOUBLE + | 0.0718 | 113.97% | 0.1600 | 145.45% |
| DOUBLE − | 0.0779 | 123.65% | 0.1280 | 116.36% |
| DOUBLE * | 0.0769 | 122.06% | 0.1240 | 112.73% |
| DOUBLE / | 0.2641 | 419.21% | 0.5660 | 514.55% |
| MIXED | | | | |
| DOUBLE = FLOAT + FLOAT | 0.0780 | 123.81% | 0.1240 | 112.73% |
| DOUBLE = FLOAT − FLOAT | 0.0750 | 119.05% | 0.1270 | 115.45% |
| DOUBLE = FLOAT * FLOAT | 0.0737 | 116.98% | 0.1290 | 117.27% |
| DOUBLE = DOUBLE/FLOAT | 0.2610 | 414.29% | 0.5610 | 510.00% |
| COMPARES | | | | |
| SHORT > | 0.0888 | 140.95% | 0.1360 | 123.64% |
| SHORT < | 0.0828 | 131.43% | 0.1330 | 120.91% |
| SHORT = | 0.0768 | 121.90% | 0.1620 | 147.27% |

Fig. 13A

| | | | | |
|---|---|---|---|---|
| SHORT ≥ | 0.0889 | 141.11% | 0.1700 | 154.55% |
| SHORT ≤ | 0.0906 | 143.81% | 0.1460 | 132.73% |
| INT > | 0.0705 | 111.90% | 0.1440 | 130.91% |
| INT < | 0.0875 | 138.89% | 0.1270 | 115.45% |
| INT = | 0.0717 | 113.81% | 0.1620 | 147.27% |
| INT ≥ | 0.0765 | 121.43% | 0.1090 | 99.09% |
| INT ≤ | 0.0876 | 139.05% | 0.1250 | 113.64% |
| INT > SHORT | 0.0843 | 133.81% | 0.1270 | 115.45% |
| INT < SHORT | 0.0877 | 139.21% | 0.1280 | 116.36% |
| INT = SHORT | 0.0733 | 116.35% | 0.2180 | 198.18% |
| INT ≥ SHORT | 0.0875 | 138.89% | 0.1250 | 113.64% |
| INT ≤ SHORT | 0.0876 | 139.05% | 0.1300 | 118.18% |
| FLOAT > | 0.1108 | 175.87% | 0.3260 | 296.36% |
| FLOAT < | 0.0890 | 141.27% | 0.3350 | 304.55% |
| FLOAT = | 0.0767 | 121.75% | 0.1460 | 132.73% |
| FLOAT ≥ | 0.1031 | 163.65% | 0.3590 | 326.36% |
| FLOAT ≤ | 0.0860 | 136.51% | 0.3600 | 327.27% |
| DOUBLE > | 0.1140 | 180.95% | 0.1950 | 177.27% |
| DOUBLE < | 0.0984 | 156.19% | 0.1630 | 148.18% |
| DOUBLE = | 0.0828 | 131.43% | 0.1560 | 141.82% |
| DOUBLE ≥ | 0.0984 | 156.19% | 0.1610 | 146.36% |
| DOUBLE ≤ | 0.0826 | 131.11% | 0.1640 | 149.09% |
| DOUBLE > FLOAT | 0.1174 | 186.35% | 0.1870 | 170.00% |
| DOUBLE < FLOAT | 0.0875 | 138.89% | 0.1810 | 164.55% |
| DOUBLE = FLOAT | 0.1064 | 168.89% | 0.2750 | 250.00% |
| DOUBLE ≥ FLOAT | 0.0969 | 153.81% | 0.1810 | 164.55% |
| DOUBLE ≤ FLOAT | 0.0888 | 140.95% | 0.2000 | 181.82% |
| | | | | |
| | | | | |
| CONVERT TO AND FROM A STRING | | | | |
| TO STRING SPRINTF(%04d) | 8.4170 | 13360.32% | 7.4100 | 6736.36% |
| TO STRING SPRINTF(%06.0f) | 238.5640 | 378673.02% | 11.7680 | 10698.18% |
| TO STRING SPRINTF(%12.0f) | 238.0484 | 377854.60% | 11.8130 | 10739.09% |
| TABLE LOOK UP (SIX DIGITS) | 1.4200 | 2253.97% | 0.1250 | 113.64% |
| TABLE LOOK UP (FOUR DIGITS) | 1.0100 | 1603.17% | 0.1100 | 100.00% |

*Fig. 13B*

| THREE DIGIT TABLE LOOKUP | 0.0753 | 119.52% | | 0.1100 | 100.00% |
|---|---|---|---|---|---|
| FROM STRING (ATOI) | 1.9169 | 3042.70% | | 2.0580 | 1870.91% |
| | | | | | |
| CASTS | | | | | |
| (INT) INT | 0.0610 | 96.83% | | 0.1180 | 107.27% |
| (INT) SHORT | 0.0750 | 119.05% | | 0.1090 | 99.09% |
| (INT) FLOAT | 0.2266 | 359.68% | | 0.1500 | 136.36% |
| (INT) DOUBLE | 0.2327 | 369.37% | | 0.1490 | 135.45% |
| (SHORT) INT | 0.0564 | 89.52% | | 0.1080 | 98.18% |
| (SHORT) SHORT | 0.0638 | 101.27% | | 0.1070 | 97.27% |
| (SHORT) FLOAT | 0.2237 | 355.08% | | 0.1530 | 139.09% |
| (SHORT) DOUBLE | 0.2232 | 354.29% | | 0.1450 | 131.82% |
| (FLOAT) INT | 0.0907 | 143.97% | | 0.2720 | 247.27% |
| (FLOAT) SHORT | 0.1094 | 173.65% | | 0.2750 | 250.00% |
| (FLOAT) FLOAT | 0.0624 | 99.05% | | 0.1080 | 98.18% |
| (FLOAT) DOUBLE | 0.0798 | 126.67% | | 0.1250 | 113.64% |
| (DOUBLE) INT | 0.1063 | 168.73% | | 0.3300 | 300.00% |
| (DOUBLE) SHORT | 0.1188 | 188.57% | | 0.3300 | 300.00% |
| (DOUBLE) FLOAT | 0.0591 | 93.81% | | 0.1380 | 125.45% |
| (DOUBLE) DOUBLE | 0.0814 | 129.21% | | 0.1080 | 98.18% |
| | | | | | |
| DIGIT EXTRACTS | | | | | |
| LOW DIGIT (INT % SHORT) | 0.2141 | 339.84% | | 1.7050 | 1550.00% |
| LOW DIGIT (INT % INT) | 0.2111 | 335.08% | | 1.7030 | 1548.18% |
| LOW DIGIT FMOD (DOUBLE, FLOAT) | 2.8593 | 4538.57% | | 5.2810 | 4800.91% |
| HIGH DIGIT FLOOR (DOUBLE/FLOAT) | 1.0267 | 1629.68% | | 4.7700 | 4336.36% |
| MODF (SEMI-SPLIT) | 0.8174 | 1297.46% | | 2.4100 | 2190.91% |
| | | | | | |
| MODF-LITE (CAST AND SUBTRACT) | 0.3106 | 493.02% | | 0.2770 | 251.82% |
| *INT HIGH (INT/SHORT) | 0.2283 | 362.38% | | 0.8700 | 790.91% |
| *HIGH1 | 0.5844 | 927.62% | | 0.9820 | 892.73% |
| *LOWDIGIT1 | 0.8937 | 1418.57% | | 1.5550 | 1413.64% |

*Fig. 13C*

| | | | | | |
|---|---|---|---|---|---|
| *LOWDIGIT2 | 0.8346 | 1324.76% | | 1.4170 | 1288.18% |
| *LOWDIGIT3 | 0.4438 | 704.44% | | 1.8520 | 1683.64% |
| *SPLIT1 (INT) | 0.4394 | 697.46% | | 2.5730 | 2339.09% |
| *SPLIT2 (DOUBLE) | 0.8190 | 1300.00% | | 1.3590 | 1235.45% |
| | | | | | |
| INT HIGH = INT/SHORT | | | | | |
| HIGH1 = (FLOAT) [(INT) [(DOUBLE) X/(FLOAT) BASE]] | | | | | |
| LOWDIGIT1 = (FLOAT) [(DOUBLE)X-[(DOUBLE) (INT)[(DOUBLE) X/(FLOAT) BASE]* (DOUBLE) BASE] | | | | | |
| LOWDIGIT2 = (FLOAT) [(DOUBLE)X-[(DOUBLE) (INT)[(DOUBLE) X/(FLOAT) BASE]* BASE] (BASE IN DOUBLE FORM) | | | | | |
| LOWDIGIT3 =[(INT) DOUBLE]%BASE (IN INT FORM) | | | | | |
| SPLIT1 = PC INT LOW DIGIT (INT% INT)+INT HIGH DIGIT (INT/SHORT) | | | | | |
| SPLIT2 = HIGH1+(ONE DOUBLE-)+CAST (FLOAT) (DOUBLE) | | | | | |

SYSTEM AND METHODS FOR LARGE-RADIX COMPUTER PROCESSING

TECHNICAL FIELD

This document relates generally to the field of computer arithmetic, and more specifically, to methods and systems for performing large-radix numeric operations.

BACKGROUND

Since most modern digital computers are transistor based, binary numbers have been traditionally used for internal computer processing. The binary number system, also known as radix-2, consists of just two unique numbers, 0 and 1, which conveniently represent the "off" and "on" states of a transistor element. In contrast, humans generally use decimal number system, also know as radix-10, which consists of numbers 0 through 9 coinciding with 10 fingers of two hands. To interact with a computer, decimal-based input data is converted to binary for computer processing. Thus, for example, when a calculation involves integers, a decimal number is represented as powers of 2 (i.e., $2^n, \ldots 2^4, 2^3, 2^2, 2^1, 2^0$), whereby decimal 23 corresponds to binary 10111. When these calculations involve fractional numbers, the results are represented as sums of inverse powers of 2 (i.e., $\frac{1}{2}, \frac{1}{4}, \frac{1}{8}, \frac{1}{16} \ldots \frac{1}{2^n}$), whereby one tenth ($\frac{1}{10}$) corresponds to a repeating binary fraction $0.0001\overline{1001}$.

Due to design limitations, most modern computers cannot effectively represent repeating binary fractions. In particular, a typical computer system recognizes several native data types, including integer, single-precision floating point, double-precision floating point and character. One of the differences between these data types is the amount of memory allocated by the system to each data type. On a typical 32-bit system, characters are often stored in 8 bits, a short data type is 16 bits, integer and single-precision floating point numbers are 32 bits, and double-precision floating point numbers are 64 bits. As a result, due to the limited memory provided by a typical computer system for representation of data, a repeating binary fraction may be truncated and rounded off to fit into the available memory. This can lead to rounding errors that cause results calculated in radix-10 and those calculated in radix-2 to be different. The differences can easily escalate when many of such rounded-off numbers are multiplied or added resulting in significant discrepancies between the decimal and binary representations. This can be problematic in many applications, especially those dealing with monetary and monetary exchange calculations.

Some of these problems can be avoided if calculations are done by the computer in a radix-10 based number system. The two most popular approaches to the radix-10 computer arithmetic are large binary integers and small decimal digits techniques. The large binary integer solution requires writing software functions that allow calculation of large integers (e.g., 256 bit integers). Calculations can be done rapidly, but it can be very difficult to determine decimal point placement for addition and subtraction, because the number is in binary, but the decimal point needs to be placed between decimal digits. Therefore this approach is generally used for fixed point calculations (e.g., calculations where the decimal point is in a fixed location in the numbers to be processed). This approach ignores the decimal point in the calculation and simply implies it in the result. The only place where the decimal point is acknowledged is when a number needs to be displayed. This also requires that all calculations be done at the same precision in order to avoid the problem of aligning two binary numbers for a decimal operation, like addition.

Another approach is the small decimal digit approach which generally uses one-half to one byte (8 bits) to store a decimal digit. Thus, each decimal digit (0-9) is encoded by a corresponding four-bit binary number, so that a sequence of decimal digits can then be represented by concatenating the four-bit binary numbers. This makes placing the decimal point easier, but the calculation is much slower because each decimal digit is handled separately. In addition, there is a significant loss of storage efficiency because four bits can store decimal numbers 0-15 but are used in this approach to store only numbers 0-9. Furthermore, similar to the large binary integer approach, implementation details for the small decimal digit method differ significantly from processor-to-processor. This makes creating a platform-independent solution difficult.

SUMMARY

In accordance with the teachings provided herein, methods and systems for performing large-radix computer arithmetic are disclosed. In one example, a method provides for one or more input decimal numbers (e.g., radix-10 numbers) to be segmented into one or more large-radix segments. The radix of each segment may be greater than the radix of a decimal number (i.e., 10). As an illustration, the radix of a segment may be a multiple of 10, such as 100, 1000, 10,000, 100,000, 1,000,000, etc. If the decimal number has a fractional part, the number may be segmented so that the decimal point is placed between two adjacent large-radix segments. Once the decimal number is segmented, various numeric operations may be performed on the large-radix segments of the decimal number. Such operations may include, but are not limited to, unary, arithmetic, logic, or character string conversion operations. Finally, the result of the numeric operation on the large-radix segments of the decimal number may be outputted in decimal form.

As another example, a computer system for large-radix arithmetic may comprise a processor and a memory. The processor may be configured to segment a decimal input number into segments having a radix greater than the radix of the decimal number. If the decimal number has a fractional part, the processor is configured to identify the decimal point and segment the decimal number so that the decimal point is placed between two adjacent large-radix segments. Each large-radix segment may be represented by any data type supported by the computer system (e.g., integer, single-precision floating point, double-precision floating point and character data types). Furthermore, large-radix segments may be stored in the system memory in one or more data structures, such as an array, a linked list, etc. A processor may then perform one or more numeric operations on the large-radix segments. As described above, the operations may include unary, arithmetic, logic, character string conversion operations, etc. The result of the numeric operation may then be outputted as a decimal number.

In another example, a system may be further configured to receive a second decimal number and segment it into one or more large-radix segments, having the same radix as the first decimal number. The large-radix segments of the second number may also be stored in a data structure, such as an array, a linked list, etc. The processor may then perform one or more numeric operations on the large-radix segments on the first and second decimal numbers. If one or both decimal numbers have a fractional part, the numeric operations of the large-radix segments of the first and second numbers are performed on the respective segments in the integral and fractional parts on the decimal numbers. Thus, for example, to perform large-radix addition, two segmented decimal numbers are aligned at the respective decimal points and added segment by segment, with a carry added (if needed) to the next segment pair. In the event the carry exceeds the available number of segments, an additional data element may be added to store the carry as a new large-radix segment. Finally, the result of the numeric operation may be outputted as a decimal number.

In another example, a computer-usable medium having computer-readable program code embodied thereon for programming one or more disparate processor-based computing systems to perform numeric operations is disclosed. The program code may comprise instructions for accepting an input decimal number from a user and segmenting the input decimal number into large-radix segments, wherein the radix of a segment is greater than the radix of the decimal number. The program code may further comprise instructions for identifying presence of a decimal point, and segmenting the decimal number so that the decimal point is placed between two adjacent large-radix segments. The program code may further comprise instructions for performing one or more numeric operations on the large-radix segments of the decimal number and instructions for outputting the result of the numeric operations as a decimal number. The program code may further comprise instructions for storing the large-radix segments of the decimal number into one or more data structures, including an array, a linked list, etc.

In yet another example, a method for implementing large-radix computer arithmetic is disclosed. First, a developer may determine a computing platform on which the large-radix arithmetic will be implemented. A computing platform may include at least a processor, a memory and an operating system. Depending on the hardware and software constraints of the computing platform, as well as the application requirements, a developer may select a radix for a large-radix segment. To select a radix, the developer may consider data types provided by the platform and cost of computation of one or more native operations on each data type. As an illustration, in a computing platform optimized for floating-point arithmetic, an operation performed on two floating-point numbers may be less costly, e.g., with respect to system time and resource consumption, than the same operation performed on two integer numbers. Based upon one or more of these considerations, instructions code for large-radix numeric operations may be written.

BRIEF DESCRIPTION OF FIGURES

FIG. 9 illustrates an example partial product optimization technique for large-radix multiplication.

FIGS. 11A and 11B illustrate an example conversion table and block diagram for large-radix character string conversion.

FIG. 12 illustrates a table indicating percentage time cost per radix-10 digit for arithmetic operations.

FIGS. 13A-13D illustrate a comparison table of various numeric operations on two example computing platforms.

DETAILED DESCRIPTION

Figure 1:
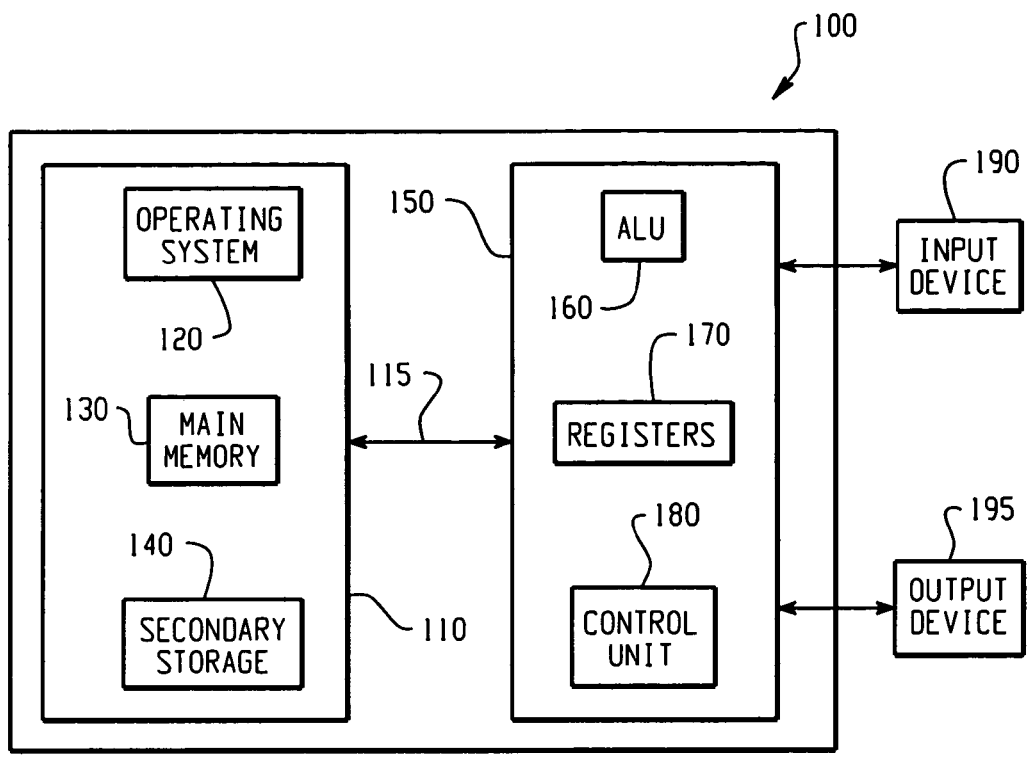
FIG. 1 is a block diagram of an example computing platform.

FIG. 1 illustrates an example computing platform for large-radix arithmetic. The computing platform 100 comprises at least one processing unit 150, a memory 110, and input and output devices 190 and 195, respectively. These elements are interconnected by a system bus 115.

Processor 150 may include an arithmetic logic unit 160, a plurality of registers 170 and a control unit 180. The ALU 160 is used for performing arithmetic operations, such addition and multiplication, and comparison operations. A collection of registers 170 may be used to store temporary values of internal operations, such as the address of the instruction being executed and the data being processed. Registers 170 may hold 32-bit or 64-bit registers, etc. Control unit 180 controls operation of the processor 150 by analyzing and executing program instructions. The instruction set architecture of the processor 150 may be implemented on different platforms, such as: a general purpose RISC architecture (e.g., MIPS, PowerPC, Precision Architecture, and SPARC), an embedded RISC architecture (e.g., ARM, Hitachi SH, MIPS 16, and Thumb), a non-RISC architecture (e.g., Intel 80×86, IBM 360/370, and VAX), etc.

System memory 110 may include an operating system 120, high-speed main memory 130 in the form of a medium such as random access memory (RAM) and read only memory (ROM), and secondary storage 140 in the form of long term storage mediums such as floppy disks, hard disks, tape, CD-ROM, flash memory, etc. and other devices that store data using electrical, magnetic, optical or other recording media. The system memory 110 may also include video display memory for displaying information through a display device. The system memory 110 can comprise a variety of alternative components having a variety of storage capacities.

System memory 110 may also contain an operating system 120. The operating system 120 can include a set of software instructions which control the operation and the resource allocation of computing platform 100. The operating system 120 may perform basic tasks, such as recognizing input from the input device 190, sending output to the output device 195, keeping track of files and directories on the main memory 130 and secondary storage 140, and controlling various peripheral devices. Furthermore, operating system 120 can provide a software platform on top of which other programs and applications can run. Examples of operating system 120 include DOS, Windows, Mac OS, Unix, Linux, etc.

Finally, the input and output devices 190 and 195 allow users to interact with the computing platform 100. In particular, the input device 190 can comprise a keyboard, a mouse, a physical transducer (e.g., a microphone), or the like. The output device 195 can comprise a display, a printer, a transducer (e.g., a speaker), or the like. Various other communication devices, such as a network card or a modem, can be used as input and/or output as well.

Figure 2:
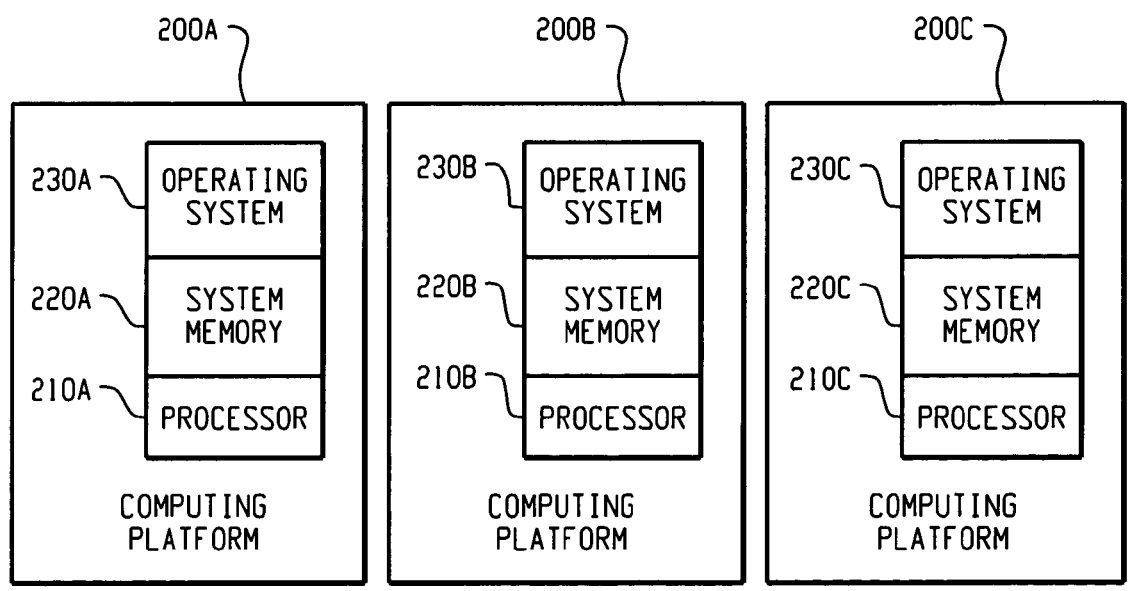
FIG. 2 is a block diagram of disparate computing platforms.

As shown in FIG. 2, a system can be implemented for large-radix arithmetic without significant variations on disparate computing platforms, such as computing platforms 200A, 200B and 200C, thereby allowing for large-radix arithmetic to be platform independent or substantially so. In particular, computing platforms 200 may comprise different types of processors 210A, 210B and 210C, different system memories 220A, 220B and 220C, as well as different operating systems 230A, 230B and 230C. However, a system for large-radix arithmetic may be implemented in substantially similar ways on platforms 200A, 200B and 200C.

A system for large-radix arithmetic is described next with reference to FIGS. 3A and 3B. The system of FIGS. 3A and 3B comprises one or more sets of software instructions 300, which can include user input instructions 310, segmentation instructions 320, numeric operations instructions 330 and user output instructions 340. Software instructions 300 may be written in a variety of programming languages, including Pascal, C, C++, Java, VisualBasic, Assembly, etc. Software instructions 300 are platform independent and as such may be executed on the computing platform 100, as well as on the disparate computing platforms 200A, 200B and 200C without significant variations.

The user input instructions 310 may be used for accepting input from a user. The input may comprise a numeric, character-based or alpha-numeric data. An example of a numeric input is number "7497416934727704623480261983465". An example of a character-based input is string "United States Patent and Trademark Office is an Agency of the United States Department of Commerce." An example of alpha-numeric input is the string "the U.S. national debt as of 16 Oct. 2004 at 08:28:18 PM GMT is $7,343,942,183,508.57."

The numeric input data may be in a variety of numeric formats. In one example, the numeric input data is in a decimal form. For convenience, the subsequent examples of the systems and methods for large-radix arithmetic will be described with reference to decimal input data format, unless noted otherwise. It should be understood, however, that user input instructions may be written to accept and to perform large-radix arithmetic on any other data format, such as binary, hexadecimal, character strings, etc. Furthermore, inputs and outputs disclosed herein may be with other than a user, such as with a computer program.

The user input instructions 310 may be executed on a computing platform 100. The user input instructions 310 may be stored in memory 110 in the main memory 130 or secondary storage 140. Once stored, the user input instructions 310 may be executed by processor 150 either directly or by means of a platform-specific compiler (not shown). During, execution, the instructions 310 may request the operating system 120 to accept user input from the input device 190. In one example, the user input instructions 310 may then request operating system 120 to store user input in one or more data files in main memory 130 for further processing.

Figure 3A:
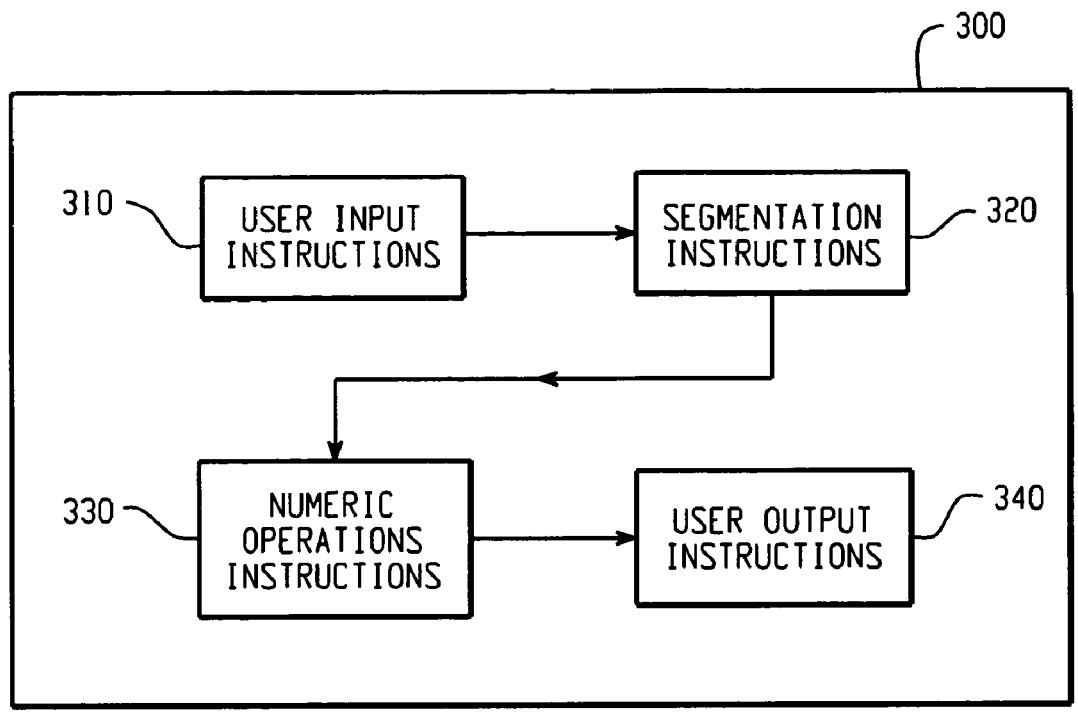
FIGS. 3A and 3B are block diagrams of a system for large-radix arithmetic.
Figure 3B:
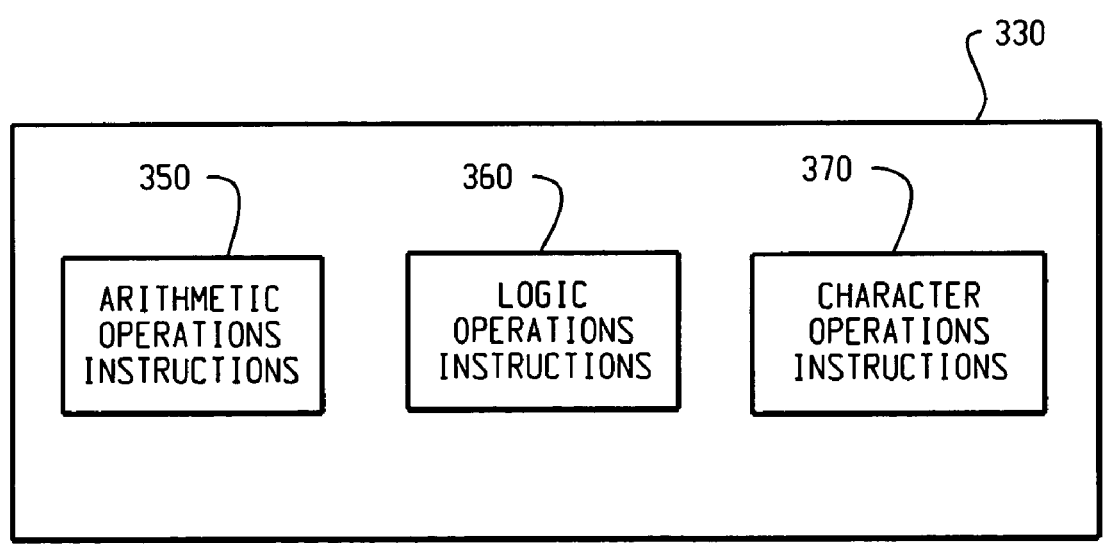

The system for large-radix arithmetic in FIGS. 3A and 3B comprises a set of segmentation instructions 320 for segmenting user input data. The segmentations instructions 320 when executed by processor 150 may access main memory 130 and retrieve user input data stored in a data file. The user input instructions 320 may further instruct the processor 150 to segment the user input data into a plurality of segments. As an illustration, numeric data, such as decimal number 749,741,693,472,770,462,348 may be segmented into several large-radix segments so that the radix of each segment is greater than the radix of the decimal number. The radix of a segment may be a multiple of 10, such as 100, 1000, 10,000, 100,000, 1,000,000, etc.

Thus, if the radix of the larger-radix segment is one thousand (1000), which corresponds to numbers 0 through 999, the above-referenced decimal number may be segmented into a plurality of three-digit segments as follows: 749 741 693 472 770 462 348. If the radix of the large-radix segment is one million (1,000,000), which correspond to numbers 0 through 999999, the above decimal number may be segmented into a plurality of six-digit segments as follows: 749 741693 472770 462348. To achieve uniformity, the most significant large-radix segment, 749, may be represented as 000749 without loss of precision, so that each large-radix segment comprises six decimal digits.

If the input is a fractional number, such as 749741693472770462348.0261983465, the segmentation instructions 320 may instruct the processor 150 to segment the integral part and fractional part separately. Thus, in radix-one million (1,000,000) segmentation, for example, the integral part of the above number may be segmented as follows 749 741693 472770 462348, while the fractional part may be segmented as 026198 3465. In addition, the most significant large-radix segment of the integral part, 749, may be represented as 000749, while the least significant large-radix segment of the fractional part, 3465, may be represented as 346500. As a result, the large-radix segments can comprise six decimal digits.

Next, the segmentation instructions 320 may request operating system 120 to store the large-radix segments in one or more data structures in memory 130. Example data structures include arrays, dynamic arrays, linked lists, stacks, queues etc. The number of the elements in the data structure may depend on the number of large-radix segments. Furthermore, two or more data structures may be used to separately store segments associated with integral and fractional parts of the input number. Alternatively, segments associated with both the integral and fractional parts of the input number may be stored in a single data structure, and the segments of integral part may be distinguished from the segments of the fractional part. In one example, such distinction may be made by assigning a pointer to identify location of the radix point, which separates segments associated with integral and fractional parts of the input number.

The segmentation instructions 320 may also indicate a data type to the elements of the data structure, e.g., large-radix segments. A data type classifies a particular type of information. A data type usually depends on the programming language in which instructions 300 are written and the data types supported by the computing platform. Data types supported by most programming languages and recognized by most computing platforms are integer, single precision floating-point, double precision floating point and character. Differences between these data types include the amount of memory allocated by the computing platform to an element of each data type and the manner in which data of different data types is organized in the system memory allocated to that element.

For example, most current computer systems use 64-bit double precision floating point data elements and only 32-bit integer type data elements. An integer data type uses all of the available 32 bits to store value of the number. A double precision floating point data type uses a part of the number of the allocated 64 bits to store the value of the number in a large-integer format with the remainder of the 64 bits being used to store the value of the exponent of the number. Because an integer data type uses all of its available 32 bits to store a value of the number, segments having a large radix can be stored as a 32 bit integer. As another example, a double precision floating point data type can potentially store segments with a much larger radix than the integer data type, however, because the double precision floating point data type uses only a fraction of the available 64 bits to store the value of the segment, the remainder of the bits used for the exponent are not used because each segment is a whole number with exponent of 1. Thus, an integer data type may be more memory efficient than the double precision data type.

Once the input numbers are segmented by the segmentation instructions 320 and the large-radix segments are stored in one or more data structures in system memory 110, the process flow proceeds to numeric operation instructions 330. The numeric operations instructions 330 may be used to perform various numeric operations on the large-radix segments on the input numbers.

As shown in FIG. 3B, numeric operations instructions 330 may comprise such instructions as arithmetic operations instructions 350, logic operations instructions 360, and character operations instructions 370, etc. Arithmetic instructions 350 may be written to support such operations as addition, subtraction, multiplication and division on two or more operands. In addition, arithmetic instructions 350 may be used perform unary number operations including negation, inversion, exponentiation, or the like. Logic operations instructions 360 may be written, for example, to compare values of two or more operands. Character operations instructions 370 may be used to perform character string conversions.

As an example, numeric operations may be performed on large-radix segments of the input number on a segment-by-segment basis. Thus for example, let the large radix value=1,000,000, let large-radix segment a=999991 and large-radix segment b=999992. Accordingly, a multiplication of a by b yields: 999991*999992=999983000072. In this example, a single precision floating point data type may be used to hold each large-radix segment and a double precision floating point data type may be used to hold the result. The result may then be split into two single-precision floating point data segments, with the least significant large-radix segment holding 000072 and the most significant large-radix segment holding 999983. The segments may then be stored in a results data structure. If the operands have more large-radix segments, the most significant large radix segment of the result, 999983, may be added as a carry to the product of other segments.

Once the numeric operations have been performed on the input number(s), the process flow proceeds to the user output instructions 340. The user output instructions 340 facilitate conversion of the large-radix numbers into decimal format or character format for such uses as display of the result of the numeric operation to the user or for other use by a computer program. As indicated above, the results of the numeric operation on input number(s) are stored in binary format in one or more data structures as large-radix segments. To display the results to the user, the output instructions 340 may, for example, command the processor 150 to convert the binary data stored as large-radix segments into decimal digits and then to concatenate all large-radix segments into a single character string of a decimal number. This character string can then be displayed to the user using output device 195. An example of conversion of large-radix segments to character string is provided below with reference to FIGS. 11A and 11B.

Figure 4:
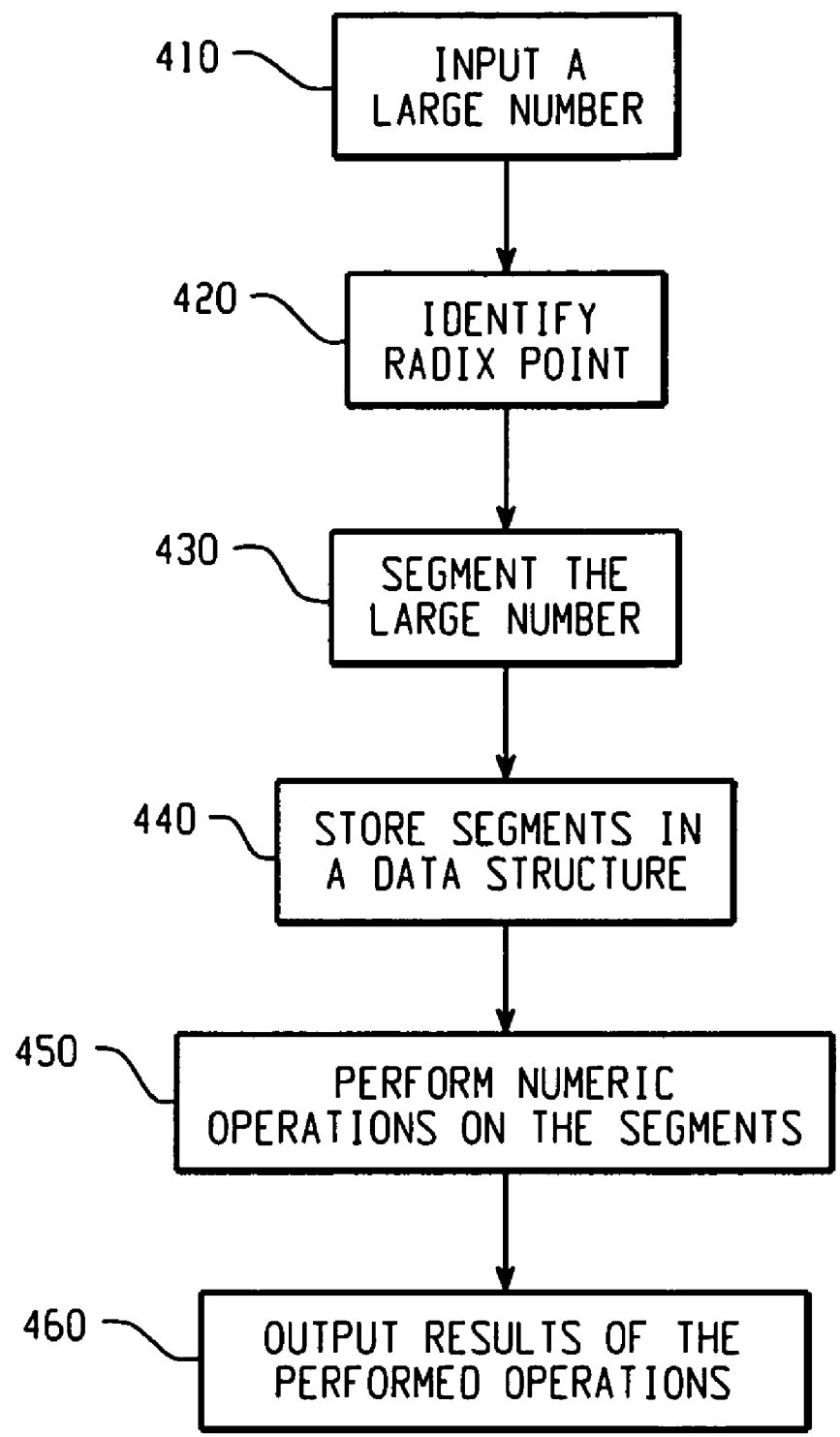
FIG. 4 is a flow diagram of an example method for large-radix arithmetic.

FIG. 4 depicts an operational scenario wherein at step 410 a user is prompted to enter one or more numbers. Because the value of the user input number(s) is unknown and it may be too large to be stored by the conventional data types, such as integer, single precision floating point or double precision floating point data type, the user input may be stored character-by-character into one or more character strings. Because in this operational scenario every digit entered by the user is stored as a character, the character string data type can contain any input number of arbitrary length. Thus, for example, if none of the conventional numeric data types can store number 749741693472770462348.0261983465, it can be readily stored as a string of characters in a character string data type.

Next in step 420, the character string(s) containing a user input number may be parsed to determine presence of a radix point. If the user input is a whole number (e.g., it does not have a fractional part), the number may be segmented in step 430 starting from the least significant digits toward the most significant digits. Thus for example, the input number 749741693472770462348 stored as a string of characters may be segmented into four radix-million segments: 749, 741693, 472770, and 462348. If the user input is a real number (i.e., it has a fractional part), each part of the number may be segmented in step 430. The integral part can be segmented starting from the least significant digits toward the most significant digits, as shown above. The fractional part in turn can be segmented in the opposite direction, starting from the most significant digits toward the least significant digits. Thus for example, in the number 749741693472770462348.0261983465, the fractional part 0261983465 may be segmented into two radix-million segments: 026198 and 3465. Furthermore, the least significant segment of the fractional part may be padded with zeros so that it comprises six decimal digits, 346500.

Next in step 440, the one or more large-radix segments may be stored in a data structure of a numeric data type. Example data structures include arrays, dynamic arrays, linked lists, stacks, queues and the like. Example data types include shorts, integers, single precision floating point, and double precision floating point and the like. The number of the elements in the data structure may depend on the number of large-radix segments in each input number. Furthermore, two or more data structures may be used to separately store segments associated with integral and fractional parts of the input number(s). Alternatively, segments associated with both the integral and fractional parts of the input number may be stored in a single data structure, and the segments of integral part may be distinguished from the segments of the fractional part using pointers for example.

Next in step 450, various numeric operations on the large-radix segments of the user input number(s) may be performed. The numeric operations may include arithmetic operations, logic operations and character operations. In turn, the arithmetic operations may include addition, subtraction, multiplication and division operations on two or more operands. They may also include unary operations such as negation, inversion and exponentiation on a single operand. Logic operations may, for example, include comparison, AND, OR, XOR, and the like. Character-based operations may include various character string conversions. In one example, the results of the large-radix operation on one or more numbers may be stored into a results data structure, which could be of the same or different data type as the original data structure(s) that is used to hold the operands.

Finally in step 460, the output of a numeric operation may be outputted (or displayed) in a user readable format. Thus, the large-radix segment(s) of the result of the numeric operation may be converted into decimal format and/or character format for display of the results to the user. Alternatively, the results may be used to perform additional large-radix operations of the large-radix segments. An example method for conversion of large-radix segments to characters for display to the user will be described below with reference to FIGS. 11A and 11B.

It should be understood, that similar to the other processing flows described herein, the steps and the order of the steps in the flowchart may be altered, modified and/or augmented and still achieve the desired outcome.

Figure 5:
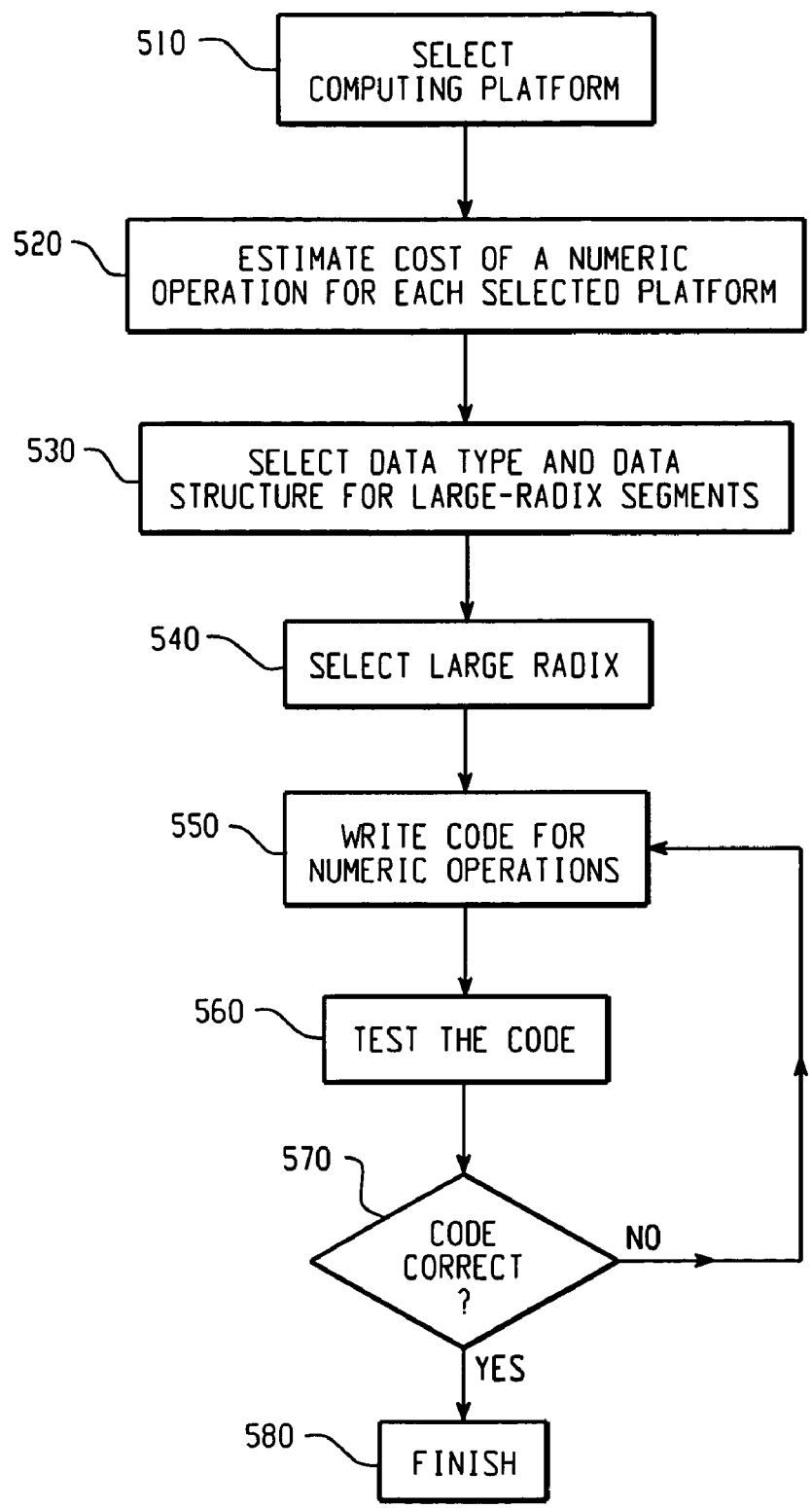
FIG. 5 is a diagram of a method for performing large-radix arithmetic on disparate computing platforms.

An example method for implementing large-radix arithmetic is described next with reference to FIG. 5. In step 510, a developer may select a computing platform on which large-radix operations will be implemented and determine the programming language in which large-radix instructions will be written. The developer may verify that the chosen programming language is available on all platforms on which the large-radix instructions will be used. The developer may also determine what numeric operations are the most important for the particular application. For example, it is possible on some computing platforms to speed up addition and subtraction, with the tradeoff being that multiplication and division are slower. The developer may also determine the processor target for each platform. For example, one might consider a computer running Linux as a platform and target the i386 processor to ensure maximum compatibility.

In step 520, a cost of computation of numeric operation(s) on different data types supported by each selected computing platform may be estimated. Such an estimation may facilitate determination of data types to be used in storing large-radix segments. FIG. 12 is a table showing relative cost per radix-10 digit of each basic arithmetic operation, including addition, subtraction, multiplication and division. (The data in table on FIG. 12 was generated using the C programming language with a variety of platform specific compilers.) In the table, values are ratios of an operation performed on a short data type (e.g., 16 bit) over a single-precision floating point data type (e.g., 32 bit). The formula for the ratios is: ((short time for operation)*4)/((float time for operation)*6). A reference ratio of 1.0 indicates that the calculation speed of a short operation is the same as that of a floating point operation for a single radix-10 digit. A ratio greater than 1.0 indicates that floating point operation is faster than a short operation. This is because a short data type produces four radix-10 digits (since the maximum radix it can support it 10,000) while a floating point data type produces six (since the maximum radix it can support is 1,000,000).

FIGS. 13A, 13B 13C and 13D illustrate a table comparing relative times for various operation on several data types on the Windows XP (Intel CICS processor) and HP-UX (HP RISC processor). This table shows the time (in seconds) required for 10,000,000 iterations of each operation. In addition each operation has a ratio of the operation time to the time required for an integer assignment operation. The choice of integer assignment is largely arbitrary and is used as a baseline value. These ratios are helpful in comparing the relative cost of each operation on different machines which have very different per operation performance.

Next in step 530, once the cost of computation has been determined and the programming language, computing platform and operation set have been chosen, the developer may then select a data type and data structure to be used to hold large-radix segments. For example, the developer may choose the data type whose mathematical operators produce the largest number of decimal digits in the shortest amount of time. In addition, several different data types may be used to hold different data segments. Furthermore, different data types may be used on different computing platforms. If the code is optimized for only a single computing platform, then certain data types may be better to use due to features available on that platform. For example, certain IA32 processes have SIMD instructions that could greatly speed up calculations.

Once the developer has chosen the characteristics of the numbers, the developer may wish to design an appropriate data structure. Different programming languages provide different data structures. In addition, there are available template libraries of various data structures. Data structures can include arrays, dynamic arrays, linked lists, queues, etc. Alternatively, a developer may design a separate data structure to hold large-radix digits. In general, a large-radix data structure may contain a collection of large-radix segments, a sign indicator, and a decimal point location. The developer may also keep the current number of large-radix segments in use and an indicator to mark the number as invalid (e.g., for results of an operation that have no valid interpretation, such as dividing a number by zero). The developer may also use two or more data structures to separately store large-radix segments associated with integral and fractional parts of the number.

In step 540, the developer may select a radix to be used in large-radix arithmetic. The radix may be selected based on one or more factors, including the type of the processor architecture (e.g., the size of processor registers, such as 32 bit or 64 bit), the memory allocated by the computing platform to the available data types (e.g., 16 bits, 32 bits, 64 bits), the aforementioned cost of computation of numeric operation(s) on different data types supported by each selected computing platform, data types supported by the selected programming language, as well as application details in which the large-radix arithmetic will be used. The radix may be greater than 10, which is the radix of a decimal number. In one example, the radix of a segment may be a multiple of 10, such as 100, 1000, 10,000, 100,000, 1,000,000, etc; however, any value of radix can be chosen.

In step 550, the developer may write the instructions code for one or more numeric operations (e.g., addition, subtraction, multiplication, division and character string conversion operations). The instructions may be written to support positive and negative numbers that contain a floating decimal point. The developer may decide whether the implementation will support only a fixed number of decimal digits or an arbitrary number of decimal digits. A fixed number of digits may offer better resource control and more opportunities for optimization. If the developer decides to implement support for arbitrary precision, the developer may wish to address a potential runaway precision situation. For example, one divided by three will generate an infinite number of digits if not somehow constrained. In one example, the developer may allocate a large number of segments to the fractional part of the number to improve precision of the result and thus control the runaway precision. Several exemplary algorithms for large-radix addition, subtraction, multiplication, division and character string conversion will be described with reference to FIGS. 6A-11B.

At step 560, the numeric operations instructions code may be tested. Numeric operations may contain subtle errors that only show up a few times in the range of the operations. To overcome an error, a developer may write a test program that generates random large decimal numbers and a random operation (+ − * /) and test the instructions code against a large number of randomly generated numbers and operations.

EXAMPLE 1

Large-Radix Addition

Addition and subtraction operations may be similar if both operands have the same sign. When the signs differ, appropriate sign changes may be made and the opposing operation may be invoked. For example: −1+2 can be rewritten as 2−1. In this example of addition, a developer could align the decimal points of the two numbers. Under this method, decimal points could be allowed between large-radix segments. One approach is to determine which of the two operands have the most digits to the right of the decimal point. This operand's lowest order large-radix segment is copied into the result variable, until the location of the lowest order segment of the other operand is reached. At this point a sum (with carry) is computed for each large-radix segment pair.

Below is an illustration of addition for an arbitrary number of digits using this method. Given two numbers:
a=42335793867023.2415134590875645 and
b=39756893578230459872.36049873

Let these numbers be segmented into large-radix segments as follows (radix=1,000,000 in this example):
a=000042 335793 867023.241513 459087 564500
b=000039 756893 578230 459872.360498 730000

Note that this effectively breaks the two numbers down into a series of six digit segments centered around their respective radix points. Now a and b can be added (with carry) as follows:

```
carry:                   1   1111 1 11     1 1111
    a:              000042 335793 867023 . 241513 459087 564500
    b:       000039 756893 578230 459872 . 360498 730000
             ------------------------------------------------
    c:       000039 756935 914024 326895 . 602012 189087 564500
```

Figure 6A:
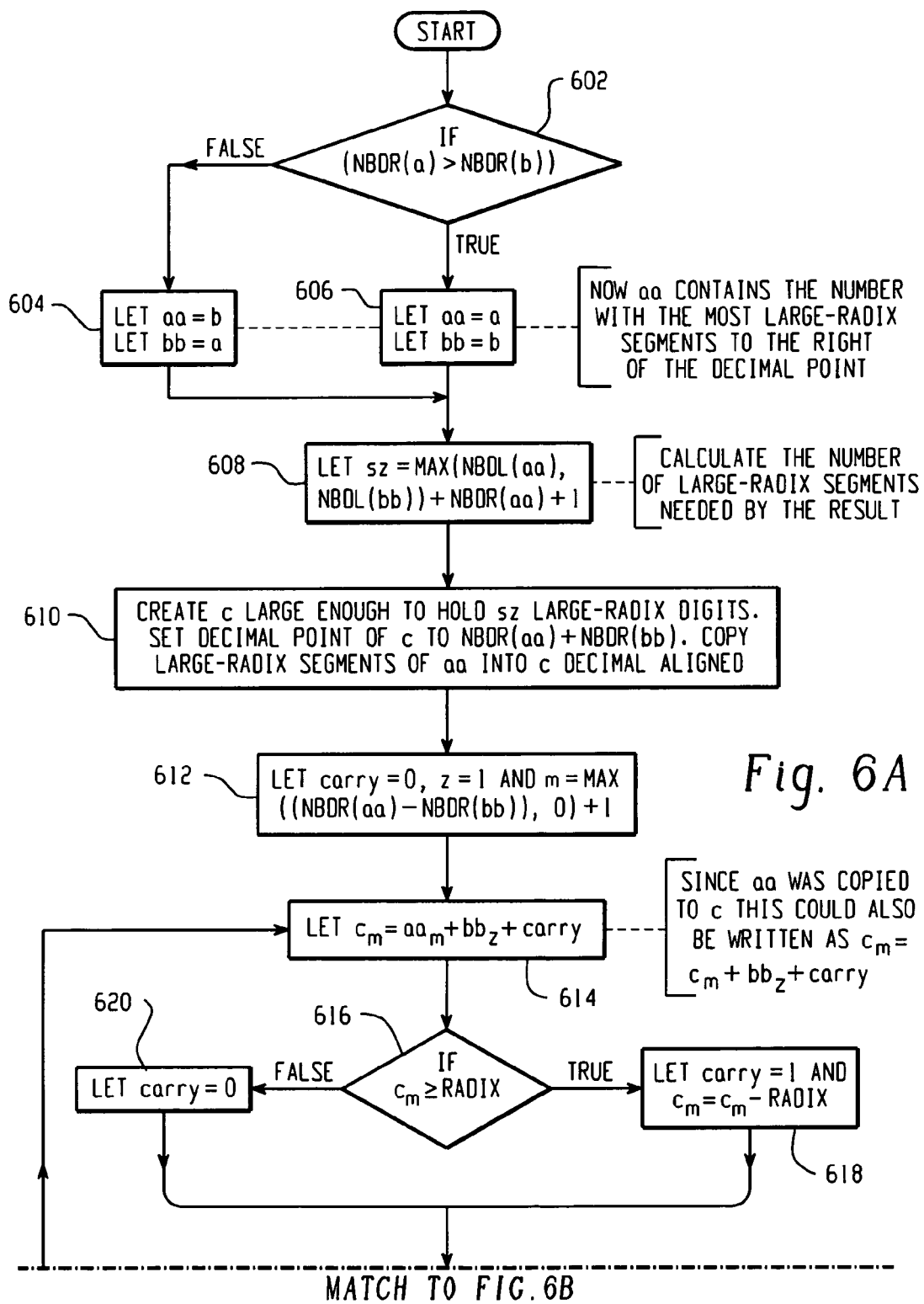
FIGS. 6A-6B are flow diagrams of an example large-radix addition algorithm.
Figure 6B:
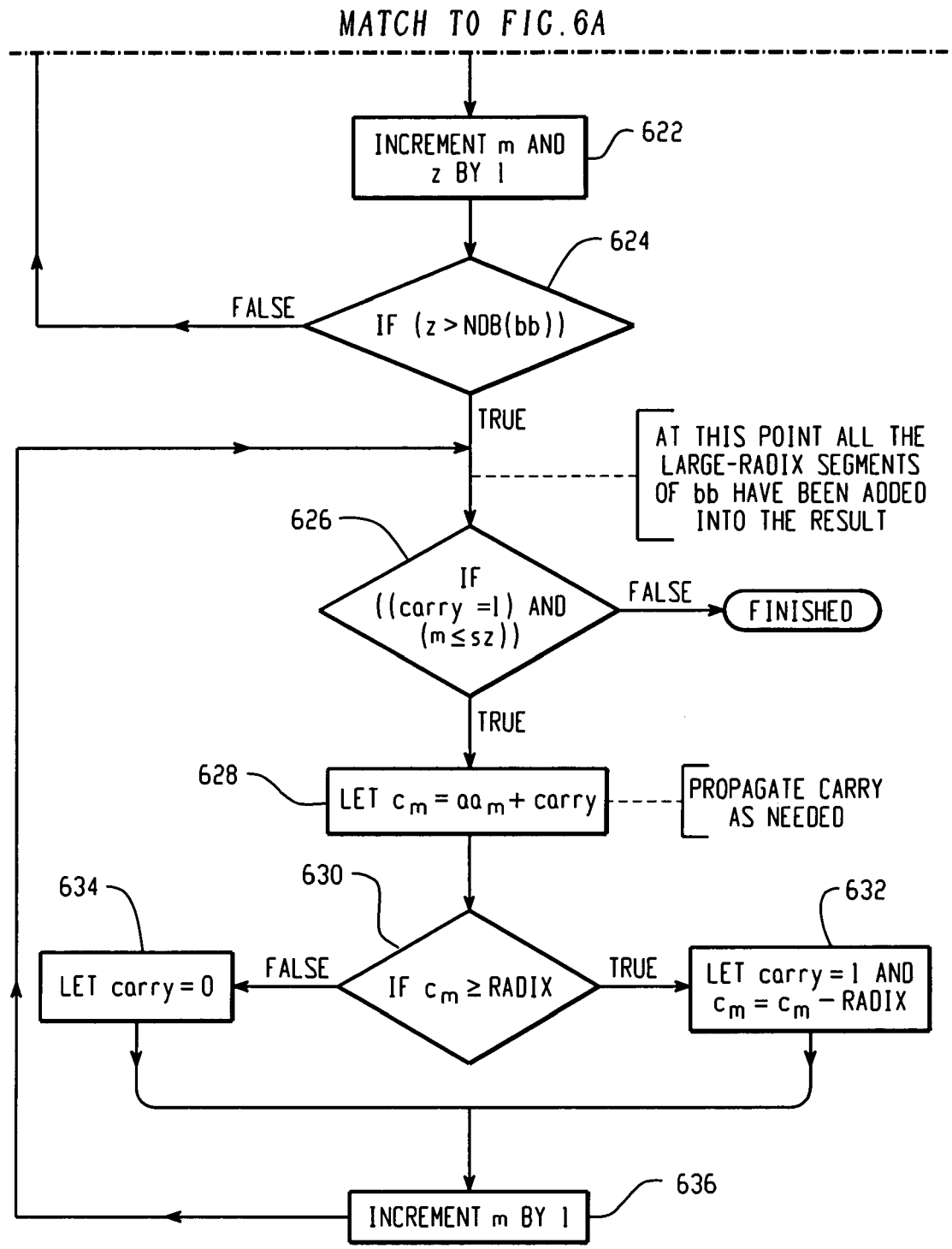

An example flow chart diagram for implementing large-radix addition on two numbers is shown in FIGS. 6A-6B. The diagram illustrates how given two numbers a and b their sum c may be calculated. Preliminarily, the numbers a and b are segmented into a series of large-radix segments, whereby segments of a are represented as $a_n a_n \ldots a_2 a_1$ and segments of b are represented as $b_a b_{a1} \ldots b_2 b_1$ where a has n large-radix segments and b has m large-radix segments. In both a and b, the decimal point is placed between two segments. Furthermore, decimal points may be aligned using buffers. Alternatively, the operation can be implemented using a purely indexed approach.

The diagram uses the following functions:

MAX(x, y)—returns the greater of the two values x and y.

NBDR(x)—returns the number of large-radix segments to the right of the decimal point. If x were $x_z x_{z-1} \ldots x_{y+1} \cdot x_y \ldots x_2 x_1$ then NBDR(x) would return y.

NBDL(x)—returns the number of large-radix segment to the left of the decimal point. If x were $x_z x_{z-1} \ldots x_{y+1} \cdot x_y \ldots x_2 x_1$ then NBDL(x) would return (z−y).

NBD(x)—returns the number of large-radix segments in x. If x were $x_z x_{z-1} \ldots x_{y+1} \cdot x_y \ldots x_2 x_1$ then NBD(x) would return z.

With reference to FIGS. 6A-6B, in step 602, the number of large-radix digits to the right of the decimal point of the number [a/b] is compared with the number of large-radix segments of number b to determine which number is greater; if a is greater then b then the process flow goes to step 606 in which variable aa is assigned value of a and variable bb is assigned value of b. Otherwise the process flow proceeds to step 604 in which variable aa is assigned value of b and variable bb is assigned value of a. Next in step 608, variable sz is assigned the number of large-number segments needed for the result. In step 610, variable c is created to store results of the large-radix segments of the result and number aa is copied into the variable c. Next, in step 612, the carry is set to 0, segment counter is set to 1, and variable m is assigned the location of the least significant segment in the fractional part of two numbers. At step 614, segment-by-segment addition with carry of numbers a and b is performed. If at step 616 it is determined that the result of the addition of two segments exceeds the assigned radix (e.g., 100, 1000, 100000), the carry is incremented and the value of the result is decremented by the value of radix at step 618. Otherwise, the carry is assigned to 0 at step 620. Next, at step 622, the segment counter is incremented. If at step 624, it is determined that the smaller number has more segments to be added, the process flow returns to step 614 and the next set of segments and the carry, if any, are added. At step 626, once all segments of the smallest number have been added and if there is no carry, then the addition of a and b is finished. If however there was a carry at step 626, it is added to the next remaining most significant large-radix segment of the larger of the two number at step 628. Next, if at step 630 it is determined that the result of the addition of the carry and the remaining segment of the larger number exceeds the assigned radix (e.g., 100, 1000, 100000), the carry is incremented at step 632 and the value of the result is decremented by the value of radix and the carry is propagated to the next segment. Otherwise, the carry is assigned to 0 at step 634. Finally, the process returns to step 626 to determine whether there are more segments or a carry that needs to be added. If all segments have been added the addition operation example is finished.

EXAMPLE 2

Large-Radix Subtraction

Below is an example of large-radix subtraction for two fractional numbers. Given two numbers:

a=39756893578230459872.36049873 and
b=42335793867023.2415134590875645

Let these numbers be segmented into large-radix segments as follows (radix=1000000 in this example):

a=000039 756893 578230 459872.360498 730000 umbers a and b may be subtracted as follows:

Numbers a and b may be subtracted as follows:

```
borrow:                    1111 1    1    11   111111 111
                           7129 3    6    59   629999 999
     a: 000039 756893 578230 459872 . 360498 730000 000000
     b:        000042 335793 867023 . 241513 459087 564500
         ---------------------------------------------------
     c: 000039 756851 242436 596849 . 118985 270912 435500
```

Figure 7:
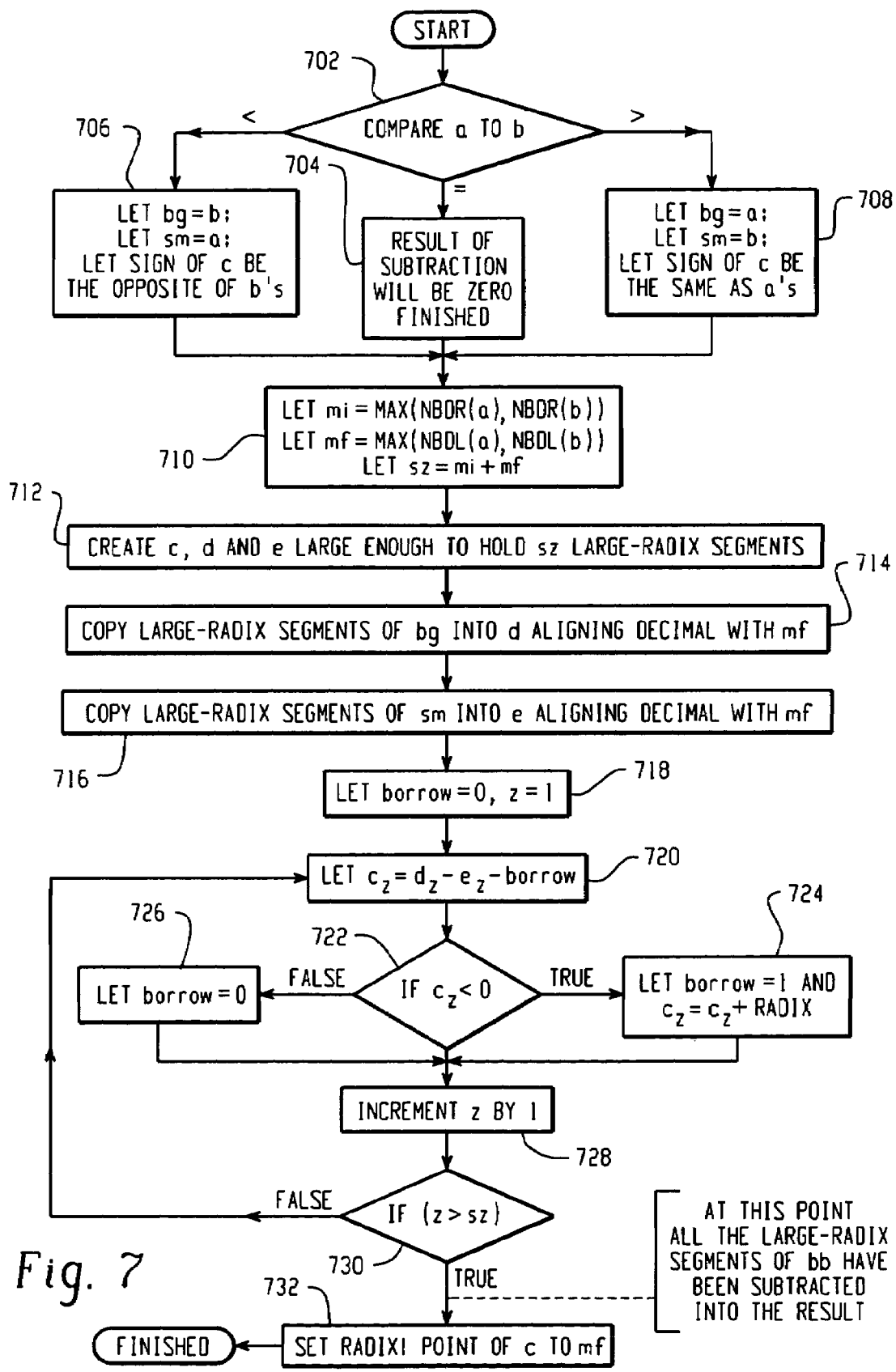
FIG. 7 is a flow diagram of an example large-radix subtraction algorithm.

An exemplary flow chart diagram for implementing large-radix subtraction of two fractional numbers is shown in FIG. 7. The following subtraction operation can be implemented on an arbitrary-sized radix segments. Specifically, the flow chart illustrates how given two numbers a and b their difference c can be calculated. First, both a and b are segmented into a series of large-radix segments. Then, a can be represented as a series of large-radix segments $a_n a_{n-1} \ldots a_2 a_1$ and b as $b_m b_{m-1} \ldots b_2 b_1$, where a has n large-radix segments and b has m large-radix segments. In both a and b the decimal point may be placed between two large-radix segments. Furthermore, decimal points may be aligned using buffers. Alternatively, the operation can be implemented using a purely indexed approach.

The diagram uses the following functions:

MAX(x, y)—returns the greater of the two values x and y.

NBDR(x)—returns the number of large-radix segments to the right of the decimal point. If x were $x_z x_{z-1} \ldots x_{y+1} \cdot x_y \ldots x_2 x_1$ then NBDR(x) would return y.

NBDL(x)—returns the number of large-radix segments to the left of the decimal point. If x were $x_z x_{z-1} \ldots x_{y+1} \cdot x_y \ldots x_2 x_1$ then NBDL(x) would return (z−y).

NBD(x)—returns the number of large-radix segments in x. If x were $x_z x_{z-1} \ldots x_{y+1} \cdot x_y \ldots x_2 x_1$ then NBD(x) would return z.

With reference to FIG. 7, in step 702, the number of large-radix digits of the number a is compared with the number of large-radix segments of number b to determine which number is greater. If the numbers are the same, the result is zero and the operation is finished at step 704. If the numbers are not the same, in steps 706 and 708 the larger of two is stored in the bg variable and the smaller one is in the sm variable. Then, in step 710, the sizes of integral and fractional parts of both numbers are determined and the number of segments associated with the largest integral part is stored into variable mi, while the number of segments associated with largest fractional part is stored into variable mf. The maximum size of the result is then computed and stored in variable sz. At step 712 one or more intermediate variables such as c, d and e may be initialized to hold large-radix segments of the largest fractional part mf and the largest integral part mi. At step 714, the large-radix segments of the larger of two operands may be copied to variable d to be aligned with the segments of the largest fractional part of the operands. At step 716, the large-radix segments of the smaller of two operands may be copied to variable e to be aligned with the segments of the largest fractional part of the operands. At step 718, a borrow variable may be assigned to 0 and the segment counter z assigned to 1. The subtraction begins in step 720, by subtracting fractional part segments of the smaller number from the segments of the larger number with borrow. At step 722, if the result of the subtraction of two segments is a negative number, which indicates that the fractional part of the larger number is smaller than the fractional part of the smaller number, at step 724, the borrow is incremented by 1 and the result of the subtraction is incremented by the value of the radix. Otherwise, at step 726, the borrow is assigned to 0 and the process flow proceeds to step 728, at which segment counter z is incremented by 1. Next at step 730, if it is determined that not all segments of the operands have been subtracted, the process flow returns to step 720, at which point the subtraction process continues. Otherwise, at step 732, the decimal point is set in the subtraction result and the subtraction operation example is finished.

EXAMPLE 3

Large-Radix Multiplication

Below is an example of large-radix multiplication of two fractional numbers. Given two numbers: a=578230459872.360493 and b=867023.24151. The number are segmented into a plurality large-radix segments (radix=1000000 in this example):

a=578230 459872.360493
b=867023.241510

Numbers a and b may be multiplied as follows:

```
a:                                578230 459872 . 360493
b:                                       867023 . 241510
          ---------------------------------------------------
Carry 1:                   139648 111063  87062
Partial 1:                        327300 686720   664430
Carry 2:    501338 398719 312555
Partial 2:                 709290 601056 722339        0
          ===================================================
                                1      1      1
            501338 247657 351974 496121   664430
c:          501339 247658 351975 496121 . 664430
```

Figure 8:
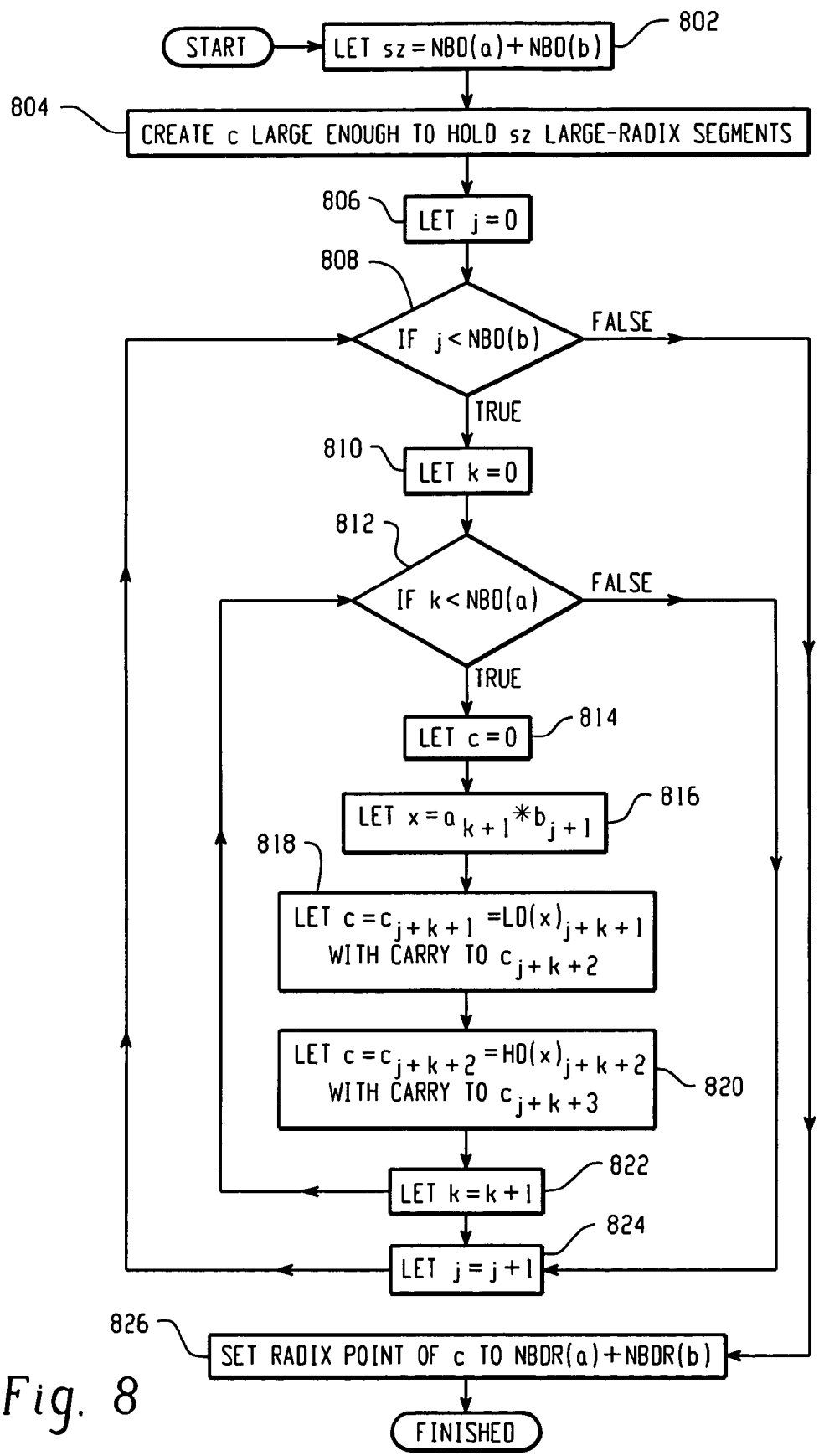
FIG. 8 is a flow diagram of an example large-radix multiplication algorithm.

An example flow chart diagram for implementing large-radix multiplication of two fractional numbers is shown in FIG. 8. The following multiplication operation can be implemented on an arbitrary-size radix segments. The flow chart illustrates how given two operands a and b their product c can be calculated. First, the operands are segmented into large-radix segments. Then, a can be represented as a series of large-radix segments $a_n a_{n-1} \ldots a_2 a_1$ and b as $b_m b_{m-1} \ldots b_2 b_1$, where a has n large-radix segments and b has m large-radix segments. In both a and b the decimal point may be placed between two large-radix segments.

The diagram uses the following functions:

NBDR(x)—returns the number of large-radix segments to the right of the decimal point. If x were $x_z x_{z-1} \ldots x_{y+1} \cdot x_y \ldots x_2 x_1$ then NBDR(x) would return y.

NBD(x)—returns the number of large-radix segments in x. If x were $x_z x_{z-1} \ldots x_{y+1} \cdot x_y \ldots x_2 x_1$ then NBD(x) would return z.

HD(x)—returns the high order large-radix segments in x. If x were composed of $x_2 x_1$ then HD(x) would return $x_2$.

LD(x)—returns the low order large-radix segments in x. If x were composed of $x_2 x_1$ then LD(x) would return $x_1$.

With reference to FIG. 8, in step 802, the number of the large-radix segments in the product is determined by adding the number of segments in each operand. Then, in step 804, two temporary variables are created to hold intermediate products of the multiplication. In step 806, an outer multiplication loop control variable j is initialized to zero. The outer multiplication loop 808 may repeat as long as the value of its control variable j does not exceed the number of segments of operand b. Next, at step 810, the inner multiplication control variable k is initialized to zero. The inner multiplication loop 812 may be repeated as long as the value of its control variable k does not exceed the number of segments of operand a. At step 814, variable d may be initialized to hold low and high order segments of the multiplication result. Alternatively, two separate variables may be used to hold the low and high order segments of the multiplication result. Next, at step 818, segments of each operand are multiplied. At steps 820 and 822, the low and high order segments of the multiplication result are stored in variable d. At step 822, the loop control variable k is incremented and the loop 812 is repeated until all segments of operand a have been multiplied by a segment of operand b. At step 824, the loop control variable k is incremented and the loop 810 is repeated until all segments of operand b have been multiplied by all segments of operand a. Finally, at step 826, a radix point is placed in the final product and this multiplication operation example is finished.

In another example, large-radix multiplication can also be done by generating partial products and summing them together. This optimization technique can be seen in example C code shown in FIG. 9. Accumulating the partial products in a type that is able to hold more than twice the number of large-radix segments than the radix allows a developer to eliminate redundant addition operations normally needed for this type of multiplication. This process works for example if the collection of base digits multiplied does not become so large that the product elements overflow. The decimal point can be calculated as the sum of the decimal point locations of the multiplicand and the multiplier.

EXAMPLE 4

Large-Radix Division

A consideration in the large-radix division is the placement of radix point. Placement of the radix point can be based on the difference between the segment count of the dividend and the divisor relative to their respective segment points. A divisor that is less than one will push the radix point to the right of its position in the dividend. In contrast, a divisor being greater than one will push the radix point to the left.

Below is an example of large-radix division for two fractional numbers. Given two numbers: a=578230459872.360493 and b=867023.24151. Let these numbers be segmented into large-radix segments as follows (radix=1000000 in this example):

a=578230 459872.360493
b=867023.241510

Now divide a by b (with the decimal point being ignored):
(a) 578230 459872 360493/(b) 867023 241510

Partial Quotient 1: 666914
578230 459872 360493−(666914*867023 241510)
Remainder=521783 960353
Partial Quotient 2: 601810
521783 960353−(601810*867023 241510)
Remainder=703379.866900

This process is repeated until a remainder is equal to zero or until the desired precision is reached. The result of a division operation might be an infinite series of digits. Therefore there may be a maximum precision limit placed on the division operation.

Figure 10A:
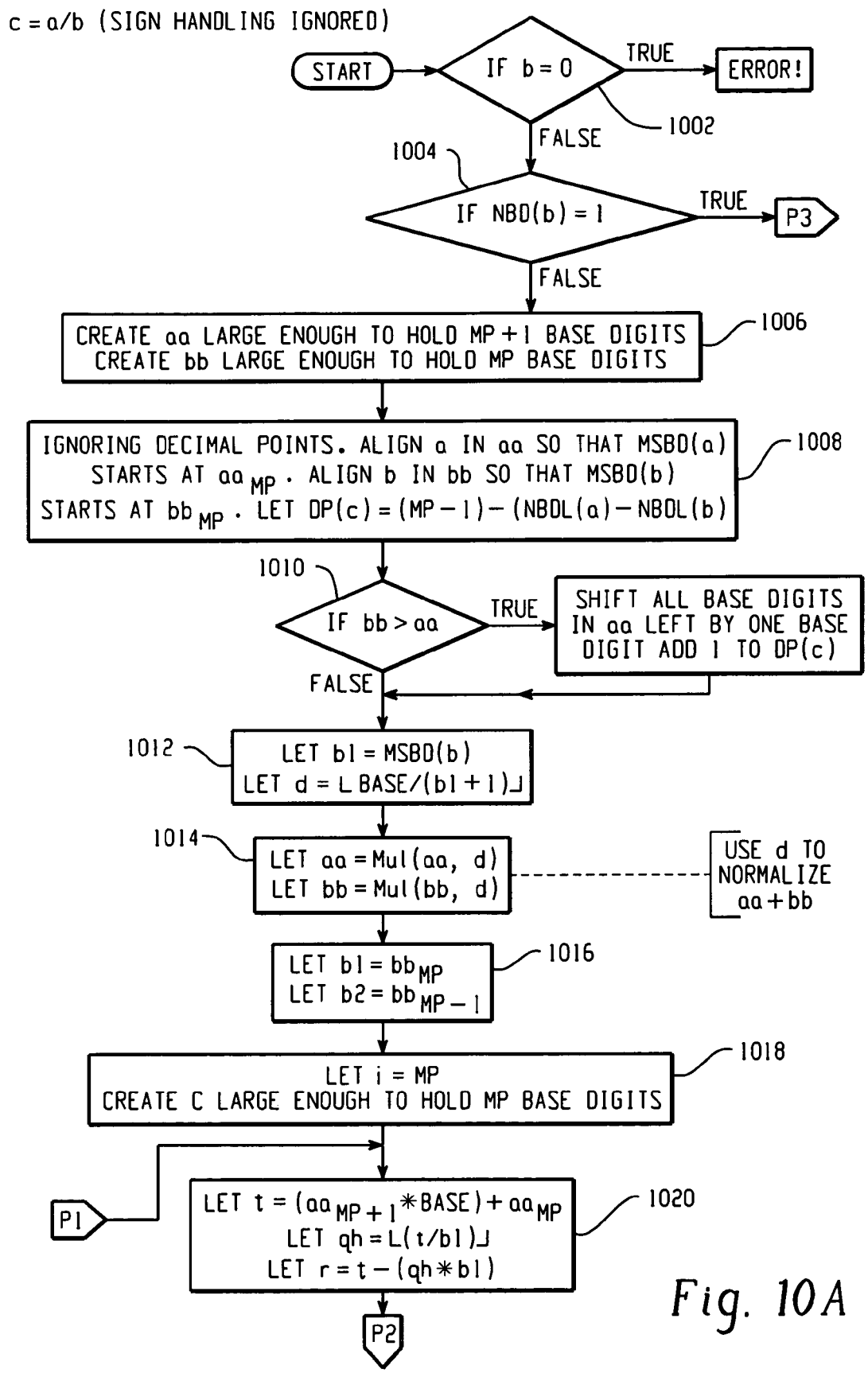
FIGS. 10A-C are flow diagrams of an example large-radix division algorithm.
Figure 10B:
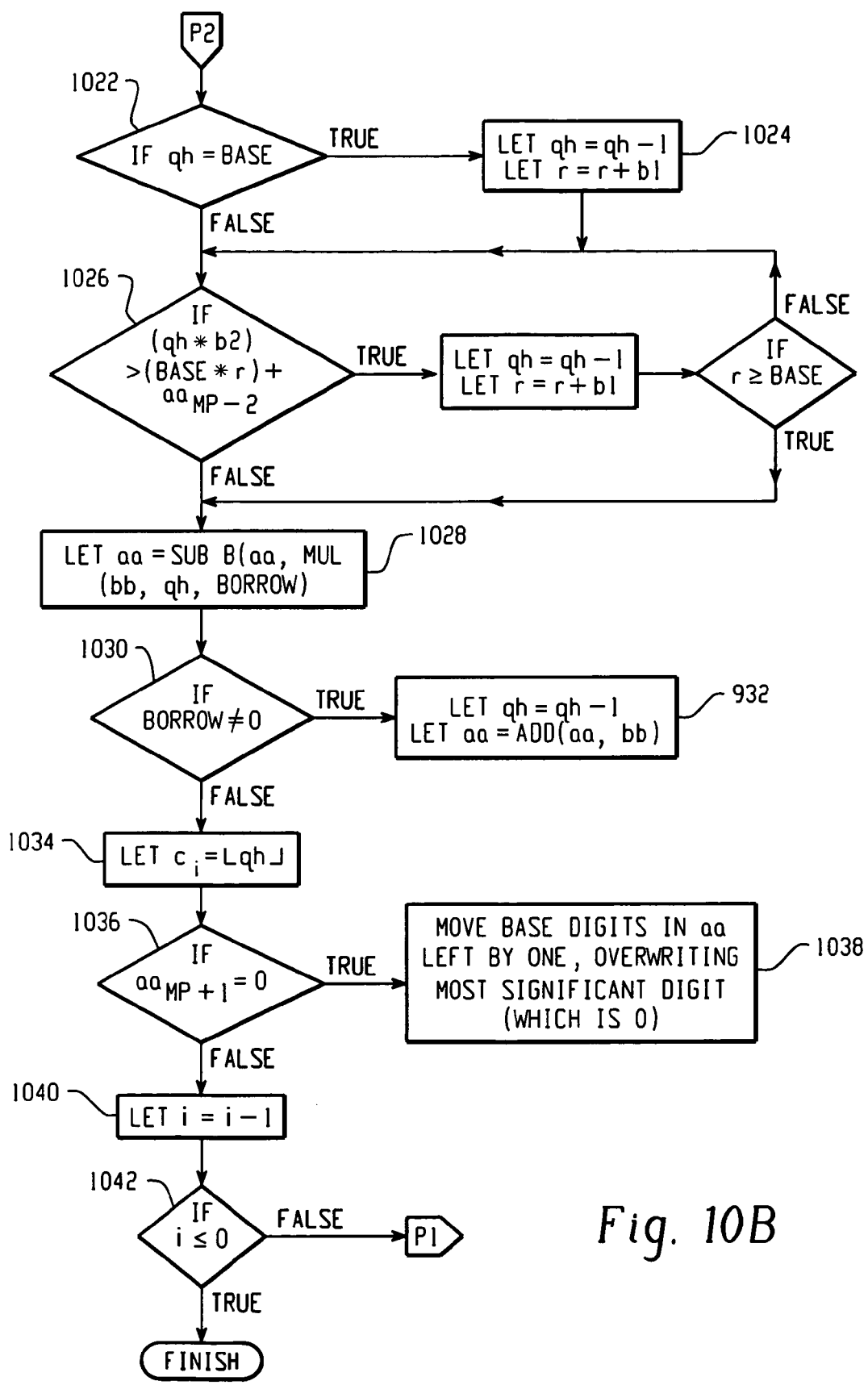
Figure 10C:
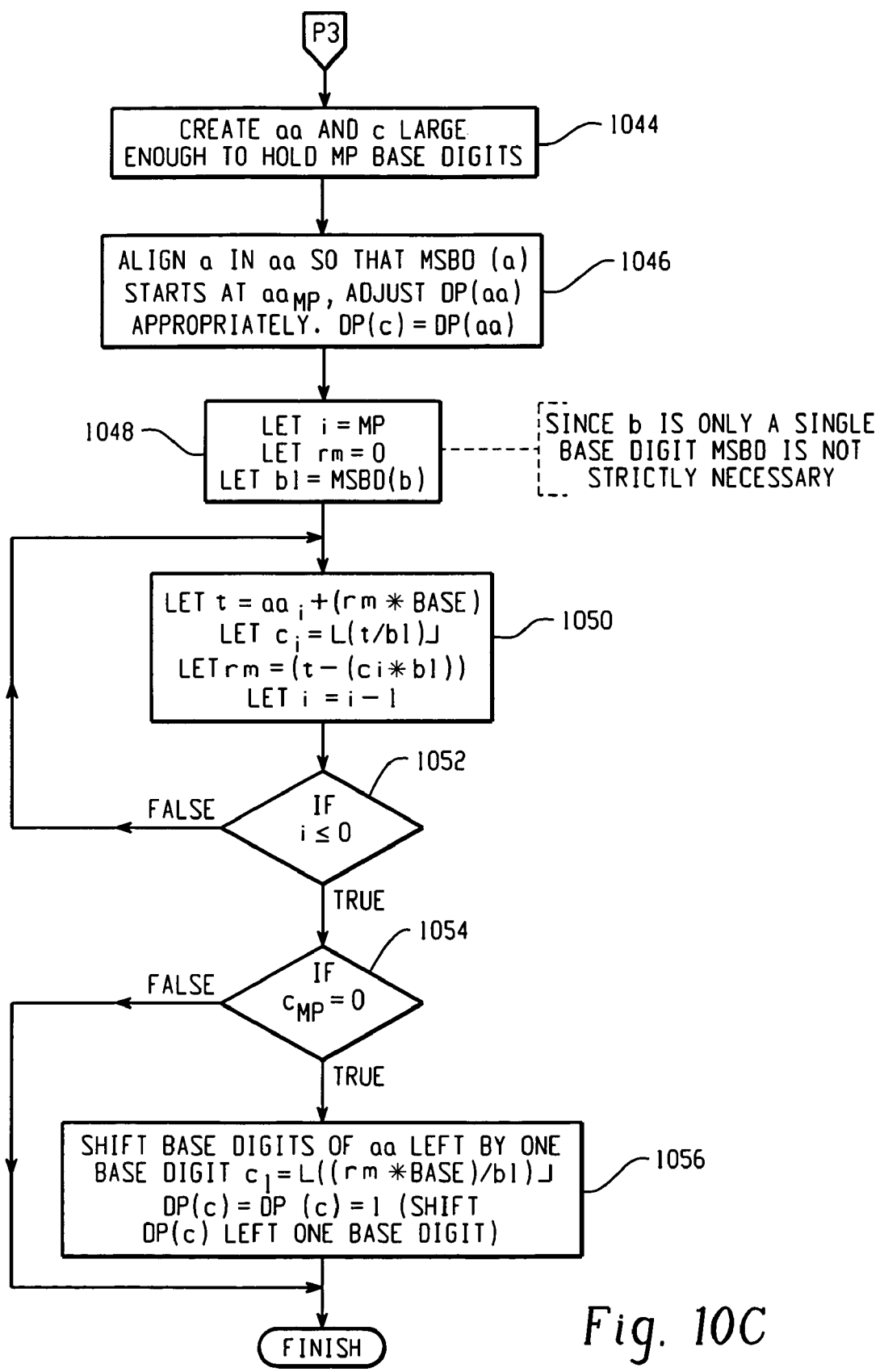

An example flow chart diagram for implementing large-radix division of two fractional numbers is shown in FIGS. 10A, 10B and 10C. Specifically, the diagram details how given two numbers a and b their quotient c can be calculated. First, the operands are segmented into large-radix segments. Then, a can be represented as a series of large-radix segments $a_n a_{n-1} \ldots a_2 a_1$ and b as $b_m b_{m-1} \ldots b_2 b_1$, where a has n large-radix segments and b has m large-radix segments. In both a and b the decimal point may be placed between two large-radix segments.

The diagram uses the following functions:

MSBD(x)—returns the most significant large-radix segment of x. If x were $x_z x_{z-1} \ldots x_{y+1} \cdot x_y \ldots x_2 x_1$ then MSBD(x) would return $x_z$.

NBD(x)—returns the number of large-radix segments in x. If x were $x_z x_{z-1} \ldots x_{y+1} \cdot x_y \ldots x_2 x_1$ then NBD(x) would return z.

MP—maximum number of large-radix segments to return in the result.

NBDL(x)—returns the number of large-radix segments to the left of the decimal point. If x were $x_z x_{z-1} \ldots x_{y+1} \cdot x_y \ldots x_2 x_1$ then NBDL(x) would return (z−y).

DP(x)—location of the decimal point within x.

[x]—floor, returns the largest whole number that is less than or equal to x.

Add(x, y)—returns the sum of x and y. Rules of the addition are based on the rules of this system. (See large-radix addition example above).

SubB(x, y, b)—returns the difference between x and y. Additional b is returned with the state of the borrow at the end of the subtraction. Rules of the addition are based on the rules of this system. (See large-radix subtraction example above).

Mul(x, y)—returns the product of x and y. Rules of the addition are based on the rules of this system. (See large-radix multiplication example above).

With reference to FIGS. 10A, 10B and 10C, decision 1002 examines whether the divisor b is 0. If it is zero, then an error is reported; else processing continues at step 1004. At step 1004, if the number of large-radix segments in the divisor b is not equal to one, two temporary variables aa and bb are used in step 1006 to hold maximum number of large-radix segments. In step 1008, the segments of the dividend and the divisor are aligned. Then, in step 1010, if the divisor is greater than the dividend, all large-radix segments of the dividend are shifted by one segment. At step 1012, variable b1 is initialized to the value of the most significant large-radix segment of divisor b and variable d is initialized to the largest whole number that is less than or equal to radix/(b1+1). At step 1014, divisor d is used to normalize variables aa and bb. At step 1016, variable b1 is initialized to $bb_{MP}$ and variable b2 is initialized to $bb_{MP-1}$. At step 1018, variable i is initialized to the value of maximum number of large-radix segments and variable c is created to hold i segments. Next, at step 1020, variable t is initialized to $(aa_{MP+1}*Radix)+aa_{MP}$; variable qh is initialized to the largest whole number that is less than or equal to the ratio of t and b1; and variable r is initialized to the difference of t and the product of qh and b1. Next, at step 1022, if qh is equal to the value of radix, variable qh is decremented by 1 and variable r is incremented by b1. At step 1026, if the product of qh and b2 is greater than the sum of $aa_{mp-2}$ and the product of radix and r, then again variable qh is decremented by 1 and variable r is incremented by b1, and if r is still less than the value of radix, then the control flow returns to step 1026. Otherwise, the process flow proceeds to step 1028, in which variable aa is decremented by the product of bb, qh and borrow. Next, at step 1034, variable $c_i$ is initialized to the largest whole number that is less than or equal to qh. At step 1036, if the most significant segment of aa (i.e., $aa_{MP+1}$) is equal to 0, then all segments in aa may be moved by 1, at step 1038. Otherwise, at step 1040, variable i is incremented by one and if at step 1042 i is determined to be greater then 0, the process flow returns to step 1020, otherwise the division operation example is finished.

If at the decision step 1004 it has been determined that the number of large-radix segments in the divisor b is equal to one, the process flow proceeds to step 1044, at which point variables aa and c may be created to hold maximum number of large-radix segments. Next, at step 1046, value of a may be aligned in variable aa so that the most significant large-radix segment of a starts at $aa_{MP}$. At step 1048, variable i is initialized to the maximum number of large-radix segments; variable rm is initialized to 0, and variable b1 is initialized to the most significant large-radix segment of divisor b. At step 1050, variable t is initialized to the sum of $aa_i$ and a product of the value of rm and the base; variable $c_i$ is initialized to the largest whole number that is less than or equal the ratio of t and b1; variable rm is initialized to the difference of value of t and product of $c_i$ and b1; and variable i is decremented by 1. Next, at step 1052, if value of variable i greater than 0, the processing step 1050 is repeated. Otherwise, the process flow proceeds to step 1054, at which value of variable $c_{MP}$ is compared to zero. If $c_{MP}$ is not equal to zero, the division operation ends. If $c_{MP}$ is equal to zero, the process flow proceed to step 1056 which adds an extra segment of precision when the most significant segment of the result is zero. More specifically in this example, the large-radix segments of variable aa are shifted to the left by one segment; variable $c_1$ is assigned the value of the largest whole number that is less than or equal to the ratio of the product of rm and radix and value of b1; location of the radix point in the result of the division is shifted left by one large-radix segment; and the division operation example ends.

EXAMPLE 5

Large-Radix Character String Conversion

Yet another large-radix operation example could be a character string conversion. If the large-radix is a whole positive power of ten, no explicit radix conversion is required when numbers are moved to and from character strings. Most programming languages have facilities to convert basic numeric types to and from string types. These can be used to convert each large-radix segment. In a language like C, for example, the library "printf" function can be used to directly convert each large-radix segment into a string representation of that segment. Since the base is a whole positive power of ten these strings can be concatenated (as in the "strcat" library function) together with the decimal point into a complete representation of the number. Alternatively, lookup tables can be used to do large-radix segment conversions. Converting from a character string to a number can be done in a similar fashion, either by calling a library function native to the implementation language (e.g., "scanf" in C) or by doing a reverse table look up.

An example method for large-radix character string conversion using a lookup table of FIG. 11A in connection with the diagram of FIG. 11B. Let number a=39756893578230459872.36049873. The number may be segmented into large-radix segments as follows (radix=1000000 in this example): a=000039 756893 578230 459872.360498 730000. Then, two functions may be defined as follows:

INT(x)=the closest whole number not greater than x

MOD(x, y)=x−(INT(x/y)*y)

The number a can be converted to a character string by starting with the most significant large-radix segment and looking up each two digit "sub-number" in FIG. 11B. The lookup may be performed on all or part of the large-radix segment in order to generate the character string faster. A larger lookup table means that fewer sub-digits need to be computed therefore a faster conversion, but a greater memory cost may be necessary to store the table.

The above-described systems and methods for large-radix arithmetic may be implemented on various types of computer architectures, such as for example on a single general purpose computer or workstation, or on a networked system, or in a client-server configuration, or in an application service provider configuration. In multiple computer systems, data signals may be conveyed via networks (e.g., local area network, wide area network, internet, etc.), fiber optic medium, carrier waves, wireless networks, etc. for communication among multiple computers or computing devices.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

As another example of the wide scope of the systems and methods disclosed herein, a system and a method can be configured for the rapid calculations of decimal based floating point numbers in a platform-independent hardware environment, wherein a fixed or arbitrary number of digits can be calculated in a time efficient manner using the instructions available in all modern hardware, while retaining the decimal (base$_{10}$) integrity of the calculation. This can be done by using either the floating point or integer units of a processor to calculate decimal numbers. A representation based on large radix segments is used. When a decimal point is needed it will fall on a boundary between two such large radix segments. This approach would work also for other bases.

What is claimed is:

1. A processor-implemented method for performing numeric operations with improved precision, comprising:
    segmenting a first number having a first radix into a plurality of segments according to executable segmentation instructions that:
        cause each segment in the plurality of segments to have a second radix that is greater than the first radix of the first number,
        identify a segment in the plurality of segments which has a number of digits that is less than the number of digits in the other segments in the plurality of segments, and
        append additional digits to the segment in the plurality of segments which has less digits than the other segments in the plurality of segments such that all segments have the same number of digits;
    performing a numeric operation on the plurality of segments; and
    outputting results of the numeric operation on the plurality of segments as a second number having the first radix.

2. The method of claim 1 further comprising: storing the segments of the first number into one or more data structures.

3. The method of claim 1, wherein the first number includes an integral part and a fractional part; wherein one or more segments contain digits to represent the integral part; wherein one or more segments contain digits to represent the fractional part; wherein a radix point of a first number is located between two segments.

4. The method of claim 3, further comprising:
    receiving a third number;
    segmenting the third number into segments;
    performing a numeric operation on the digits of the integral part and fractional part of the first number using the third number's segments; and
    outputting results of the numeric operations as a fourth number having the first radix.

5. The method of claim 4, further comprising: storing the segments of the third number into one or more data structures.

6. The method of claim 4, wherein a numeric operation comprises one or more of a unary operation, arithmetic operation, logic operation, or a character string conversion operation.

7. The method of claim 4, wherein each segment's digit is in one of the following data types: an integer, a floating point number, or a character string.

8. A processor-implemented method for performing numeric operations with improved precision, comprising:
    identifying an integral part and a fractional part of a first number having a first radix;
    segmenting the integral part and fractional part of the first number into a plurality of segments according to executable segmentation instructions that:
        cause each segment in the plurality of segments to have a second radix that is greater than the first radix of the first number,
        identify a segment in the plurality of segments which has a number of digits that is less than the number of digits in the other segments in the plurality of segments, and
        append additional digits to the segment in the plurality of segments which has less digits than the other segments in the plurality of segments such that all segments have the same number of digits;
    performing a numeric operation on the plurality of segments; and
    outputting results of the numeric operation on the plurality of segments as a second number having the first radix.

9. The method of claim 8, further comprising:
    storing the segments of the first number into one or more data structures.

10. The method of claim 8, further comprising:
    receiving a third number having an integral part and a fraction apart;
    segmenting the integral part and fraction apart of the third number into segments;
    performing a numeric operation on the digits of the integral part and fractional part of the first number using the third number's segments; and
    outputting results of the numeric operation as a fourth number having the first radix.

11. The method of claim 8, further comprising:
    storing the segments of the third number into one or more data structures.

12. The method of claim 8, wherein the numeric operation comprises one or more of a unary operation, arithmetic operation, logic operation, or a character string conversion operation.

13. The method of claim 8, wherein each segment's digit is in one of the following data types: an integer, a floating point, or a character string.

14. A processor-based computing system for performing numeric operations with improved precision, comprising:
    a memory medium for storing at least a portion of a first number having a first radix, the first number including an integral part and a fractional part;
    a processor operably coupled to the memory medium and configured:
        (i) to identify the integral part and fractional part of the first number,
        (ii) to segment the integral part and fractional part of the first number into a plurality of segments according to executable segmentation instructions that:
        cause each segment in the plurality of segments to have a second radix that is greater than the first radix of the first number,
        identify a segment in the plurality of segments which has a number of digits that is less than the number of digits in the other segments in the plurality of segments, and
        append additional digits to the segment in the plurality of segments which has less digits than the other segments in the plurality of segments such that all segments have the same number of digits; and
        (iii) to perform a numeric operation on the plurality of segments; and
    wherein results of the numeric operation on the plurality of segments are output as a second number having the first radix.

15. The system of claim 14, wherein the processor is further configured to:
    store the segments of the first number into one or more data structures.

16. The system of claim 14, wherein the processor is further configured to:
    receive a third number having an integral part and a fraction apart;

segment the integral part and fraction apart of the third number into segments;

perform a numeric operation on the digits of the integral part and fractional part of the first number using the third number's segments; and output results of the numeric operation as a fourth number having the first radix.

17. The system of claim 14, wherein the processor is further configured to:

store the segments of the third number into one or more data structures.

18. The system of claim 14, wherein the processor is configured to perform one or more of the following numeric operations: unary operation, arithmetic operation, logic operation, or a character string conversion operation.

19. The system of claim 14, wherein each segment's digit is in one of the following data types: an integer, a floating point, or a character string.

20. A computer storage medium having computer readable program code embodied thereon for programming one or more disparate processor-based computing systems to perform numeric operations with improved precision, the program code comprising:

instructions to segment a first number having a first radix into a plurality of segments according to executable segmentation instructions that:

cause each segment in the plurality of segments to have a second radix that is greater than the first radix of the first number, identify a segment in the plurality of segments which has a number of digits that is less than the number of digits in the other segments in the plurality of segments, and append additional digits to the segment in the plurality of segments which has less digits than the other segments in the plurality of segments such that all segments have the same number of digits;

instructions to perform a numeric operation on the plurality of segments; and instructions to output results of the numeric operation on the plurality of segments as a second number having the first radix.

21. The medium of claim 20, further comprising:

instructions to store the segments of the first number into one or more data structures.

22. The medium of claim 20, wherein the first number includes an integral part and a fractional part; wherein one or more segments contain digits to represent the integral part; and wherein one or more segments contain digits to represent the fractional part.

23. The medium of claim 20, further comprising:
instructions to receive a third number;
instructions to segment the third number into segments;
instructions to perform a numeric operation on the digits of the integral part and fractional part of the first number using the third number's segments; and
instructions to output results of the numeric operations as a fourth number having the first radix.

24. The medium of claim 20 further comprising:
instructions to store the segments of the third number into one or more data structures.

25. The medium of claim 20, wherein a numeric operation comprises one or more of a unary operation, arithmetic operation, logic operation, or a character string conversion operation.

26. The medium of claim 20, wherein each segment's digit is in one of the following data types: an integer, a floating point number, or a character string.

27. A processor-implemented method for performing numeric operations with improved precision, comprising:

segmenting a first number having a first radix, an integral part and a fractional part, wherein the first number is segmented into a plurality of integral part segments and a plurality of fractional part segments according to executable segmentation instructions that:

cause each segment in the plurality of integral part segments and fractional part segments to have a second radix that is greater than the first radix of the first number, identify an integral part segment which has a number of digits that is less than the number of digits in the other integral part segments, append additional digits to the beginning of the integral part segment which has less digits than the other integral part segments such that all integral part segments have the same number of digits, identify a fractional part segment which has a number of digits that is less than the number of digits in the other fractional part segments, and append additional digits to the end of the fractional part segment which has less digits than the other fractional part segments such that all fractional part segments have the same number of digits;

performing a numeric operation on the plurality of integral part segments and fractional part segments; and outputting results of the numeric operation on the plurality of integral part segments and fractional part segments as a second number having the first radix.

* * * * *